US009710555B2

(12) United States Patent
Smith et al.

(10) Patent No.: US 9,710,555 B2
(45) Date of Patent: Jul. 18, 2017

(54) USER PROFILE STITCHING

(75) Inventors: Kevin G. Smith, Lehi, UT (US);
William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 292 days.

(21) Appl. No.: 13/035,286

(22) Filed: Feb. 25, 2011

(65) Prior Publication Data

US 2015/0293997 A1  Oct. 15, 2015

Related U.S. Application Data

(63) Continuation-in-part of application No. 12/789,715, filed on May 28, 2010, now Pat. No. 8,676,875.

(51) Int. Cl.
| *G06F 7/00* | (2006.01) |
| *G06F 17/30* | (2006.01) |
| *G06Q 30/02* | (2012.01) |
| *H04L 12/58* | (2006.01) |
| *G06Q 50/00* | (2012.01) |

(52) U.S. Cl.
CPC ....... *G06F 17/30861* (2013.01); *G06Q 30/02* (2013.01); *G06Q 30/0269* (2013.01); *G06Q 50/01* (2013.01); *H04L 51/32* (2013.01)

(58) Field of Classification Search
CPC ........ G06Q 30/02; G06Q 10/00; G06Q 50/01; G06Q 10/10; G06Q 10/107; G06Q 30/0242; G06Q 30/0251; G06Q 30/08; G06Q 99/00; G06F 17/30386; G06F 17/30867; G06F 15/163; G06F 17/2745; G06F 17/2809; G06F 17/3053; G06F 17/30539;

(Continued)

(56) References Cited

U.S. PATENT DOCUMENTS 6,480,885 B1 * 11/2002 Olivier .......................... 709/207
7,069,308 B2 *  6/2006 Abrams ........................ 709/218

(Continued)

OTHER PUBLICATIONS

Non Final Office Action in related U.S. Appl. No. 12/789,715 dated Jun. 12, 2013, 11 pages.

(Continued)

*Primary Examiner* — Scott A Waldron
*Assistant Examiner* — Mellissa M Ohba
(74) *Attorney, Agent, or Firm* — Kilpatrick Townsend & Stockton LLP

(57) ABSTRACT

Methods and techniques may be provided for matching user profiles on distinct social media platforms. A first profile is retrieved from a first social media platform. The first profile is identified by one or more search criteria. Responsive to identifying an instance of the one or more search criteria on a second social media platform, a first probability is determined. A second profile is identified by the one or more search criteria on the second social media platform. The first probability predicts whether the second profile is associated with an entity associated with the first profile. The determining the first probability further comprises comparing an attribute of the first profile to an attribute of the second profile. Responsive to determining that the first probability exceeds a threshold, a match indicating that the second profile is associated with an entity associated with the first profile is recorded.

18 Claims, 14 Drawing Sheets

(58) Field of Classification Search
CPC ........... G06F 17/30598; G06F 17/3064; G06F 17/30958; G06N 3/08; G06N 7/005
See application file for complete search history.

(56) References Cited

U.S. PATENT DOCUMENTS

| | | | |
|---|---|---|---|
| 7,421,429 B2 | 9/2008 | Thota | |
| 7,596,597 B2* | 9/2009 | Liu et al. | 709/204 |
| 7,689,624 B2 | 3/2010 | Huang et al. | |
| 7,890,581 B2* | 2/2011 | Rao et al. | 709/204 |
| 8,027,931 B2* | 9/2011 | Kalaboukis | 705/319 |
| 8,060,463 B1* | 11/2011 | Spiegel | 707/609 |
| 8,082,288 B1 | 12/2011 | Yeh et al. | |
| 8,131,745 B1* | 3/2012 | Hoffman et al. | 707/766 |
| 8,234,346 B2* | 7/2012 | Rao et al. | 709/207 |
| 2001/0054153 A1* | 12/2001 | Wheeler et al. | 713/185 |
| 2003/0177110 A1* | 9/2003 | Okamoto et al. | 707/3 |
| 2005/0171799 A1* | 8/2005 | Hull et al. | 705/1 |
| 2005/0216550 A1* | 9/2005 | Paseman et al. | 709/202 |
| 2006/0074905 A1 | 4/2006 | Yun et al. | |
| 2006/0074932 A1* | 4/2006 | Fong et al. | 707/100 |
| 2006/0247940 A1* | 11/2006 | Zhu et al. | 705/1 |
| 2007/0214097 A1 | 9/2007 | Parsons et al. | |
| 2007/0265864 A1 | 11/2007 | Chess et al. | |
| 2008/0052102 A1* | 2/2008 | Taneja et al. | 705/1 |
| 2008/0097867 A1* | 4/2008 | Engle | 705/26 |
| 2008/0270038 A1* | 10/2008 | Partovi et al. | 702/19 |
| 2009/0030932 A1* | 1/2009 | Harik et al. | 707/102 |
| 2009/0125511 A1 | 5/2009 | Kumar | |
| 2009/0192896 A1 | 7/2009 | Newton et al. | |
| 2009/0222302 A1* | 9/2009 | Higgins et al. | 705/7 |
| 2009/0282144 A1 | 11/2009 | Sherrets et al. | |
| 2009/0319288 A1* | 12/2009 | Slaney et al. | 705/1 |
| 2010/0057548 A1 | 3/2010 | Edwards | |
| 2010/0153324 A1* | 6/2010 | Downs et al. | 706/21 |
| 2010/0205254 A1 | 8/2010 | Ham | |
| 2010/0274815 A1* | 10/2010 | Vanasco | 707/798 |
| 2011/0066497 A1* | 3/2011 | Gopinath et al. | 705/14.53 |
| 2011/0125826 A1* | 5/2011 | Erhart et al. | 709/202 |
| 2011/0191352 A1* | 8/2011 | Jones et al. | 707/749 |
| 2011/0191417 A1* | 8/2011 | Rathod | 709/204 |
| 2011/0231240 A1* | 9/2011 | Schoen et al. | 705/14.41 |
| 2011/0231296 A1 | 9/2011 | Gross et al. | |
| 2011/0307312 A1 | 12/2011 | Goeldi | |
| 2012/0041907 A1* | 2/2012 | Wang et al. | 706/12 |
| 2014/0074928 A1* | 3/2014 | B'Far et al. | 709/204 |

OTHER PUBLICATIONS

Non Final Office Action in related U.S. Appl. No. 14/179,082 dated Nov. 25, 2014, 13 pages.
Non Final Office Action in related U.S. Appl. No. 14/179,082 dated Mar. 25, 2014, 11 pages.

* cited by examiner

USER PROFILE STITCHING

This application is a continuation-in-part of U.S. patent application Ser. No. 12/789,715, which was filed on May 28, 2010 now U.S. Pat. No. 8,676,875.

BACKGROUND

Recent years have seen an explosion in the popularity and availability of social media platforms, such as social networking applications, web logs ("blogs"), message boards, interactive news websites, photo-sharing sites, etc. Social media allows users to interact with one another, such as by posting new content and/or by posting reactions to content posted by others. As such, social media platforms provide users with forums in which to engage in conversations with one another. A single user can have accounts, linked to user profiles, on multiple social media platforms.

The wealth of sentiment and opinion that exists on social media platforms is of great value to companies that wish to identify potential customers, to steer public sentiment regarding particular brands, to steer social trends, and/or to otherwise communicate with target customers in identifiable demographic groups.

However, the challenge of gathering and interpreting this valuable data is a significant, and as yet unsolved, problem. A single social media platform may include thousands of posts, organized into many different threads and posted by a combination of thousands of different users. Further, many users may each create content on multiple social networks. In many cases, conversations started on one platform may spill over onto another, different users may have different audiences, levels of influence, multiple usernames or multiple accounts, posts may express different sentiments or may be of varying levels of interest, etc. Many types of businesses stand to benefit greatly from gathering and understanding social media data.

SUMMARY

Methods and techniques are disclosed for matching user profiles on distinct social media platforms. A first profile is retrieved from a first social media platform. The first profile is identified by a one or more search criteria. Responsive to identifying an instance of the one or more search criteria on a second social media platform, a first probability is determined. A second profile is identified by the one or more search criteria on the second social media platform. The first probability predicts whether the second profile is associated with an entity associated with the first profile. The determining the first probability further comprises comparing an attribute of the first profile to an attribute of the second profile. Responsive to determining that the first probability exceeds a threshold, a match indicating that the second profile is associated with an entity associated with the first profile is recorded.

Figure 1:
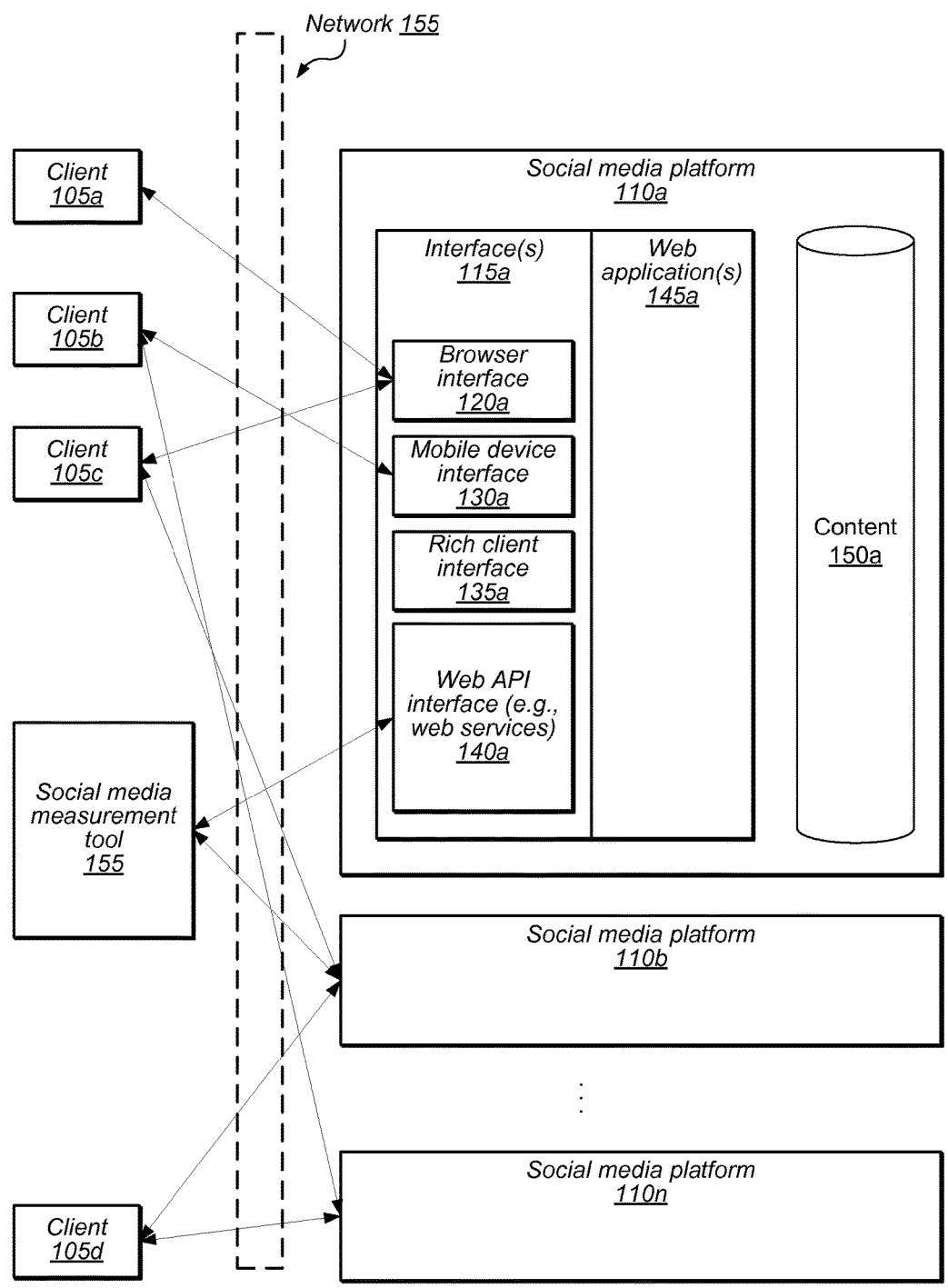
FIG. 1 illustrates a social media infrastructure, including multiple clients interacting with multiple social media platforms over a network, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Use of Social Media Profiles in Targeting Communications

Social media marketers use various tools to distribute content on social media platforms (SMPs) and to thereby influence consumer sentiment. For example, given a keyword or phrase, such tools may target content (e.g., posts) to audiences that consume content containing the given keyword or phrase on various social media platforms. Additionally, such tools may target content (e.g., advertising, direct communication, filtered search results) to individuals that influence communication related to those keywords (called influencers) or audiences that consume content containing the given keyword or phrase on various social media platforms.

In some embodiments, the tool may utilize statistical inference techniques to determine that two user profiles on two different platforms are actually profiles associated with, owned by, or used by the same user. Such techniques may be referred to herein as user-stitching, profile stitching or profile matching. For example, in some embodiments, the tool may start by receiving the identity, in the form of a user name or other user identifier, of a given user on a first social media platform. The tool may then use various interfaces of the platform to retrieve a profile for that user from the first social media platform. The profile may include attributes defining items of personal information about the user, such as the user's actual name, physical address, affiliated networks and/or organizations, interests, photographs, and/or other personally identifying profile data. In some embodiments, a search profile is built using these attributes.

According to various embodiments, the tool may then search a second social networking platform or plurality of platforms for the instances of the user name and/or for various other combinations of data retrieved from the profile information (e.g., real name and home city). In some embodiments, for each instance of the user name or other match on one of the searched platforms, the tool may retrieve the matching user's profile from the second social media platform and compare various elements of that profile with those of the profile retrieved from the first social media platform. The tool may then utilize various statistical inference techniques for determining a probability that the matching profile from the second social media platform is actually associated with, owned by, or used by the same entity associated with the first profile on the first social media platform. As used herein, an "entity" may mean a person, group of persons, computing device or process, or a legal entity such as a corporation.

In some embodiments, the tool may iteratively adjust these probabilities based on profiles found on other social networking platforms. For example, if the tool matches a first user account from a first platform with a second user account from a second platform, but the two user accounts list different screen names in their respective profiles, then the tool may assign the match a first probability. However, if a subsequent search finds a third user account on a third platform, where the third user account is a high probability match for the first user account, but has the same screen name as the second user account, the tool may revise upward the match probability of the first and second user accounts.

In various embodiments, the tool may perform various searches based on different combinations of user profile information. The searches that the tool performs may be dependent on the particular elements available in each profile, the number of matches found, the probabilities, and/or other stop conditions.

In some embodiments, the measurement tool may be configured to determine that two user accounts belong to the same person if the tool calculates the matching probability between the two accounts to be above a given threshold. In some embodiments, a user of the social media measurement tool may specify this threshold.

In one embodiment, a user profile identified by a user identifier, such as a username or a real name, is retrieved from a first social media platform, such as a social network. A plurality of social media platforms is searched for instances of the user identifier on respective ones of the plurality of social media platforms. Responsive to identifying an instance of the user identifier on a second social media platform among the plurality a first social media platforms, a first probability is determined. The first probability predicts a likelihood of whether a second profile identified by the instance of the user identifier on the second social media platform is associated with a person associated with the first profile. In some embodiments, the first probability is based on a comparison of one or more attributes of the first profile to one or more corresponding attributes of the second profile. In some embodiments, such a comparison will be facilitated by retrieval of the second profile from the second social media platform. In other embodiments, such a retrieval is optional as profile attributes can be derived from content otherwise accessible on the social media platform.

In some embodiments, the determining the first probability further comprises calculating a uniqueness score for a value of the attribute of the first profile. As an example, if the compared attribute is an email address, absolute uniqueness is possible based on the single attribute. In some embodiments, the determining the first probability further comprises calculating a uniqueness score for a combination of values of attributes of the first profile. As an example, a "real name" attribute value of "John Smith" in combination with a "location" attribute value of "Chicago, Illinois" might be assessed to have a low uniqueness score due to the commonness of that name in the particular geographic region. A "real name" attribute value of "Pasquale Leonetti" in combination with a "location" attribute value of "Navasota, Texas" might be assessed to have a high uniqueness score due to the uncommonness of that name in the particular geographic region.

In some embodiments, the first probability is compared to a threshold. If the first probability exceeds a threshold, one or more attributes of the second profile are added to a search profile. The search profile is a data structure for aggregating attributes from one or more profiles that may be used for matching a profile to another profile or for subsequent content targeting applications. A search profile may also contain content extracted from a social media platform that is associated with a particular user profile. In alternative embodiments, search profiles may be omitted and profiles extracted from the various social media platforms may be compared in their native form. In some embodiments, the search profile comprises the attribute of the first profile. In some embodiments, the search profile is initially built with attributes of the first profile and progressively built with additional attributes of profiles identified as being associated with, owned by, or used by the same user of the first profile.

Responsive to identifying an instance of the user identifier on a third social media platform of the plurality, a second probability is determined. The second probability predicts whether a third profile identified by the instance of the user identifier on the third social media platform is associated with the person associated with the first profile. The determining the second probability further comprises comparing one or more attributes of the search profile to one or more corresponding attributes of the third profile. In some embodiments, the determining the second probability includes calculating a uniqueness score for one or more values of the one or more attributes of the search profile.

In various embodiments, the plurality of social networks may be searched for profiles matching attributes other than user identifiers and the second probability can be calculated based on whether a profile identified through a match of one or more attributes other than the user identifier is associated with the person associated with the first profile. In some embodiments, a user may be prompted to confirm or reject a potential match between profiles by entering a manual match assessment in response to a prompt showing the two potential match profiles and asking the user to accept or reject the match. In some embodiments, a manual match assessment is treated as dispositive. For example, some embodiments set the match probability to 100% if a manual match assessment results in a user indicating the presence of a match. Likewise, a profile can be discarded from consideration or its probability can be set to 0% if a manual match assessment results in a user indicating the absence of a match. Further, in some embodiments, a manual match assessment can result in an "I don't know" value, and a probability may not be altered on the basis of the manual match assessment. The receipt of a manual match assessment may, in some embodiments, trigger a reassessment and adjustment of probabilities for matches to other profiles, adjusting the probabilities either up or down based on the result of the manual match assessment.

In some embodiments, user-generated content associated with a profile can be compared to determine a match. As an example, image comparison or comparison of the content of text or the writing style employed in the content of a profile may be used. Some embodiments may support processing content to generate derivatives of the content to associate with a profile. For example, a hash function may be used to compare images associated with profiles or an index of word occurrence frequency in posts associated with particular profiles may be compared.

In some embodiments, sources of information outside of a social media platform may be used to add attributes to a search profile for subsequent comparison to profiles. In some embodiments, searches may be performed iteratively. That is, as new matches between profiles are accumulated and additional attributes are added to a search profile, the probabilities of matches between profiles may be recalculated to identify new matches. Some iterations may be triggered by a new match. Some iterations may be triggered by additions or changes to a search profile or by additions or changes to the underlying social media platform profiles or content associated with the profiles on the social media platforms.

Content may then be targeted to various profiles associated with a user on the basis of all information in profiles that have been stitched together. For instance, a search engine may order results tailored to the interests of the user on the basis of all information known from the user's various profiles. Alternatively, product recommendations may be tailored to the interests of the user on the basis of all information known from the user's various profiles. In some embodiments, influencers with respect to a particular topic may be identified and communications may be targeted to profiles known to belong to the influencer. These communications may range from manual contact with a marketing operative to targeted advertising. In some embodiments, stitched profiles may be used to assess and adjust advertising keyword sales transactions on the basis of information drawn from stitched profiles of users known to have interest in particular keywords.

Anatomy of an Example Social Media Platform

FIG. 1 illustrates a social media infrastructure, including multiple clients interacting with multiple social media platforms over a network, according to some embodiments. The illustrated infrastructure includes a plurality of social media platforms 110a-110n, where the use of the variable "n" is intended to indicate that a variable number of platforms may be searched by embodiments. Social media platforms, such as social media platforms 110a-110n, provide users with forums on which to post content, view content, and/or react to content posted by other users. In various embodiments, such platforms may include Blogging sites (e.g., Blogger™), microblogging tools (e.g., Twitter™), social networking communities (e.g., Facebook™, MySpace™, LinkedIn™, etc.), video sharing sites (e.g., YouTube™), photo sharing sites (Flickr™), discussion forums, and various other tools that enable users to post, view, and/or react to user-generated content.

In the illustrated embodiment, social media platforms 110a-110n may be independent of one another. Each of social media platforms 110a-110n may be autonomously administered by different entities (e.g., different companies) and may or may not share content or interact with one another. Each may have different sets of users represented by user profiles (not shown in FIG. 1).

In the illustrated embodiment, social media platform 110a includes content 150a, and one or more web applications 145a configured to access content 150a. Content 150a may include various user-generated content (e.g., posts, replies), user-generated metadata (e.g., relationships among users, post ratings), system-generated metadata (e.g., usage statistics, analytics data, etc.), and possibly other information.

In various embodiments, content 150a may be stored in one or more databases on one or more computers of a compute cluster, datacenter, and/or any other hardware configuration. In some embodiments, social media platform 110a may include various internal APIs (e.g., RDBMS, software libraries, etc.) for internal access to content 150a or user profiles by one or more web applications 145a.

As used herein, the term web application refers to any software program and/or logic accessible by one or more clients from over a network. For example, in some embodiments, web applications 145a may include code executable to implement a social networking website (e.g., Facebook™) that a client (e.g., clients 105a-105d) may access from across a network (e.g., network 155) via a browser interface (e.g., browser interface 120a) that is configured to receive HTTP requests from a browser executing on a client. In some such embodiments, the social networking website application may be configured to respond to client requests by sending HTML to the corresponding client via browser interface 120a.

In some embodiments, a social media platform, such as social media platform 110a, may include various other web applications 145a and/or interfaces 115a. For example, client 105b may be executing a mobile application (e.g., an application on a mobile phone) that is configured to access a mobile-platform specific web application of 145a via a mobile-platform specific interface, such as interface 130a. Similarly, interfaces 115a may include one or more rich client interfaces (e.g., 135a), web API interfaces (e.g., 140a), and/or other interfaces. In various embodiments, different web applications may expose multiple interfaces of one or more types to clients from over the network.

As shown in FIG. 1, different social media platforms 110a-110n may service different and/or overlapping sets of users. For example, clients 105a, 105b and 105c are users of social media platform 110a. Clients 105c and 105d are users of social media platform 110b. Clients 105b and 105d are users of social media platform 110n. For purposes of discussion herein, it is assumed that each of clients 105a-105n supports a specific person associated with user profiles on various ones of social media platforms 110a-110n that the respective person uses.

According to various embodiments, a social media measurement tool 155 may access, retrieve, aggregate, and/or analyze social media content (e.g., content 150a), including user profiles (not shown in FIG. 1) stored on one or more social media platforms 110a-110n. For example, in some embodiments, social media measurement tool 155 may be configured to query social media platform 110a via web API 140a, such as a web services interface, to retrieve content relevant to a given keyword or phrase of interest or to match profiles representing the same user across social media platforms 110a-110n. As used herein, the term keywords refers to any word, phrase, or other logical combination of words/phrases, such as those including negations, AND, OR, exclusive OR, regular expressions, etc.

In some embodiments, Web API interface 140a may be implemented as a web service that uses one or more protocols, such as Representational State Transfer (REST) or Simple Object Access Protocol (SOAP), to exchange messages with clients, such as social media measurement tool 155. In some embodiments, social media measurement tool may be configured to access content 150a via other interfaces, such as browser interface 120a.

According to the illustrated embodiment, social media measurement tool 155 may gather data from social media platforms 110a-110n. Social media platforms 110b-100n may include any or all of the components depicted in or described with respect to social media platform 110a, including respective content, one or more web applications, user profiles, and one or more interfaces to those web applications. In various embodiments, social media measurement tool 155 may access each of the social media platforms 110a-110n using the same or different types of interfaces. For example, if social media platform 110a includes a robust Web API interface, such as web API 140a, while social media platform 110b includes only a browser interface, social media measurement tool 155 may be configured to utilize the appropriate respective interface for accessing each platform.

Figure 2A:
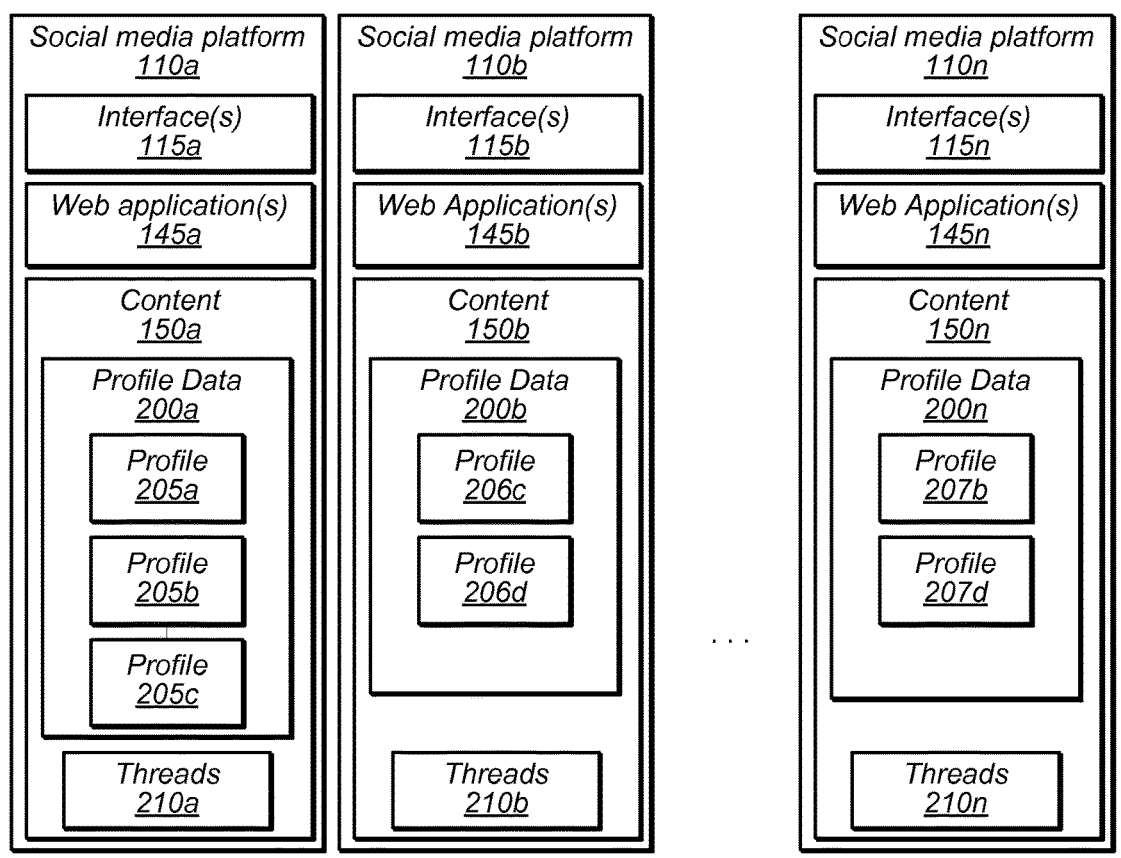
FIG. 2A depicts examples of user profiles on three social media platforms, according to various embodiments.

FIG. 2A depicts examples of user profiles on three social media platforms, according to various embodiments. FIG. 2A depicts social media platforms 110a-110n of FIG. 1, but differs from FIG. 1 with respect to the components that are shown for each of social media platforms 110a-110n. Each of social media platforms 110a-110n contains, as described above with respect to FIG. 1, interfaces 115a-115n, web applications 145a-145n, and content 150a-150n.

Within content 150a-150n, each of social media platforms 110a-110n stores profile data 200a-200n and threads 210a-210n. Threads 210a-210n contain user-generated content, such as discussion posts, which are described in more detail below with respect to FIG. 2C. Each of profile data 200a-200n contains database records or other data storage structures for storing information related to the user accounts of users of social media platforms 110a-110n. As illustrated in the example discussed with respect to FIG. 2, each of the clients 105a-105n of FIG. 1 will be assumed, for the sake of simpler figures and clearer explanation, to represent a single user of social media platforms 110a-110n. In actual implementations, however, one of skill in the art will readily realize, in light of having read the present disclosure, that a single client can support multiple users who each may own and be represented by distinct profiles on a single social media platform. One of skill in the art will further realize in light of having read the present disclosure that use of the embodiments described herein will support multiple users who each own or are represented by distinct profiles on one or more single social media platforms interacting with the respective social media platforms through one or more of the set of clients.

As discussed above, each of profile data 200a-200n contains database records or other data storage structures for storing information related to the user accounts of users of social media platforms 110a-110n. On social media platform 110a, profiles 205a-205c contain data related to the accounts of users of social media platform 110a. On social media platform 110b, profiles 206c-206d contain data related to the accounts of users of social media platform 110b. On social media platform 110n, profiles 207b and 207d contain data related to the accounts of users of social media platform 110a. One of skill in the art will readily realize, in light of having read the present disclosure, that while social media platforms 110a-110n are shown for the sake of clearer explanation as having a total of only seven profiles, embodiments will support social media platforms in which each platform actually supports hundreds, thousands or millions of profiles representing respective users.

Embodiments allow a social media measurement tool, such as social media measurement tool 155 discussed above with respect to FIG. 1, to identify profiles from among profiles 205a-205c, profiles 206c-206d and profiles 207b and 207d that are owned by, used by, or representative of the same person. For example, embodiments allow a social media measurement tool, such as social media measurement tool 155 discussed above with respect to FIG. 1, to determine that profile 205b on social media platform 110a and profile 207b on social media platform 110n are owned by, used by, or representative of the same person. Similarly, embodiments allow a social media measurement tool, such as social media measurement tool 155 discussed above with respect to FIG. 1, to determine that profile 205c on social media platform 110a and profile 206c on social media platform 110b are owned by, used by, or representative of the same person. Likewise, embodiments allow a social media measurement tool, such as social media measurement tool 155 discussed above with respect to FIG. 1, to determine that profile 206d on social media platform 110d and profile 207d on social media platform 110n are owned by, used by, or representative of the same person.

Figure 2B:
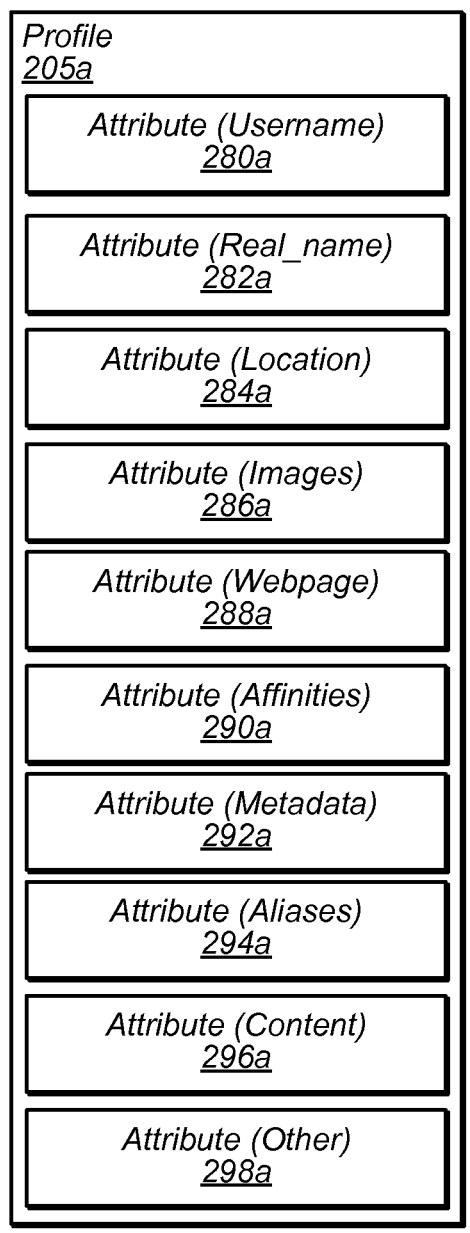
FIG. 2B illustrates an example profile on an example social media platform, according to various embodiments.

FIG. 2B illustrates an example profile on an example social media platform, according to various embodiments. Profile 205a contains information, organized as attributes 280a-298a, related to a particular user. Attribute (Username) 280a includes a user identifier associated with an account represented by profile 205a. In some embodiments, attribute (Username) 280a will be locally unique on a particular one of social media platforms 110a-110n, but will be globally non-unique and will exist on multiple ones of social media platforms 110a-110n. Some embodiments will use a match between usernames on two social media platforms as an indication of that the two profiles associated with the username are owned by, used by, or representative of the same person. Some embodiments may calculate a uniqueness score for attribute (Username) 280a that may be used in determining whether a match exists between profiles. Some embodiments are, however, configured to ascertain that two profiles are owned by, used by, or representative of the same person in spite of the fact that usernames for the two profiles are not identical.

Attribute (Real_Name) 282a includes a user identifier associated with an account represented by profile 205a. While attribute (Real_Name) 282a may not be locally unique on a particular one of social media platforms 110a-110n, existence of matching values of attribute (Real_Name) 282a on multiple ones of social media platforms 110a-110n allows some embodiments to use a match between values of attribute (Real_Name) 282a on two social media platforms as an indication of that the two profiles associated with the username are owned by, used by, or representative of the same person. Some embodiments may calculate a uniqueness score for attribute (Real_Name) 282a that may be used in determining whether a match exists between profiles. Some embodiments are, however, configured to ascertain that two profiles are owned by, used by, or representative of the same person in spite of the fact that attribute (Real_Name) 282a is not identical for the two profiles.

Attribute (Location) 284a includes information related to the physical location of a user. Examples of attribute values for location include geographic information (e.g., a physical address, longitude and latitude, bearings in a cellular network, or a home town) that directly indicates a specific geographic value. Alternatively, attribute (Location) 284a can include information that is a loose proxy for geographic information, such as an Internet Protocol address, the name of a company, an indication of a language preferred by the user. Attribute (Location) 284a is used by some embodiments to determine the likelihood of a match between profiles on two social media platforms as an indication that the two profiles are owned by, used by, or representative of the same person. Some embodiments may calculate a uniqueness score for attribute (location) 284a, either alone or in combination with other attribute values from profile 205a, that may be used in determining whether a match exists between profiles. As an example, a "real name" attribute value of "John Smith" in combination with a "location" attribute value of "Chicago, Illinois" might be assessed to have a low uniqueness score due to the commonness of that name in the particular geographic region. A "real name" attribute value of "Pasquale Leonetti" in combination with a "location" attribute value of "Navasota, Texas" might be assessed to have a high uniqueness score due to the uncommonness of that name in the particular geographic region.

Attribute (Images) 286a includes information related to images associated with profile 205a. In some embodiments, attribute (images) 286a will include a data structure for storing images associated with a profile on a social media platform, such as images posted to threads, images stored in conjunction with a profile, or images tagged by the user associated with profile 205a or other users as being relevant to the user of profile 205a. In other embodiments, attribute (images) 286a will include pointers to storage locations of images associated with a profile on a social media platform, such as images posted to threads, images stored in conjunction with a profile, or images tagged by the user associated with profile 205a or other users as being relevant to the user of profile 205a. Some embodiments will perform direct comparison of images stored in or pointed to by attribute (images) 286a (or of their pointers) for use in determining the likelihood of a match between profiles on two social media platforms as an indication that the two profiles are owned by, used by, or representative of the same person.

In some embodiments, a "profile picture" may be given special weight. In such embodiments, profile pictures associated with different profiles may be directly compared and a match between profile pictures may be used as a dispositive and the probability of a match may be adjusted upward to 100% based on the presence of matching profile pictures. Exclusions with respect to matching profile photos may be provide for frequently occurring images (such as stock photos, photos of celebrities, or common avatars). Additionally, the presence of matching uploaded images between image storage facilities of profiles on different networks may be used to adjust the probability that a match exists between the profiles, and uniqueness calculations may be employed to determine the strength of matches based on images. For examples, a photograph occurring in only two profiles would suggest a match more strongly than a photograph present in one thousand profiles.

Some embodiments will hash images stored in or pointed to by attribute (images) 286a and compare hash values as a component in determining the likelihood of a match between profiles on two social media platforms as an indication that the two profiles are owned by, used by, or representative of the same person. A hash function is any well-defined procedure or mathematical function that converts a large, possibly variable-sized amount of data into a small datum. The values returned by a hash function are called hash values, hash codes, hash sums, checksums or simply hashes. Use of a hash function to compare images stored in or pointed to by attribute (images) 286a speeds data comparison in determining the likelihood of a match between profiles on two social media platforms as an indication that the two profiles are owned by, used by, or representative of the same person. Additionally, images stored in or pointed to by attribute (images) 286a may be presented to a user to provide assistance in generating a manual match assessment.

Attribute (Webpage) 288a includes information related to web pages associated with profile 205a. Examples of web pages associated with profile 205a include web pages linked by profile 205a and web pages linked by threads contributed to or read by a user associated with profile 205a. In some embodiments, attribute (webpage) 288a will include pointers (e.g., uniform resource locators) to storage locations of web pages associated with a profile on a social media platform. Some embodiments will perform direct comparison of web pages pointed to by attribute (web pages) 288a (or of their pointers) for use in determining the likelihood of a match between profiles on two social media platforms as an indication that the two profiles are owned by, used by, or representative of the same person.

Some embodiments will generate word frequency distributions for web pages pointed to by attribute (webpage) 288a and compare the resulting word frequency distributions as a component in determining the likelihood of a match between profiles on two social media platforms as an indication that the two profiles are owned by, used by, or representative of the same person.

Attribute (Affinities) 290a includes information related to the biography or commercial proclivities of a user of profile 205a. Some embodiments will perform direct comparison of values of attribute (Affinities) 288a, alone or in combination with other attributes, for use in determining the likelihood of a match between profiles on two social media platforms as an indication that the two profiles are owned by, used by, or representative of the same person. As an example of a value of attribute (Affinities) 290a, two profiles may indicate graduation from the same college or a preference for the same brand of cheese. Some embodiments may use uniqueness scores for such values to determine whether a match is particularly informative with respect to the likelihood that two profiles are owned by, used by, or representative of the same person.

Attribute (Metadata) 292a includes information related to system activities undertaken by a user associated with profile 205a. In various embodiments, such metadata may include system generated metadata (e.g., posts authored by a user, time/date of the profile creation) and/or user-specified metadata (e.g., relationships between profiles or posts created by profiles, rating or flagging of the content in posts created by a profile, etc.). Some embodiments may use patterns in metadata for determining the likelihood that two profiles are owned by, used by, or representative of the same person.

Attribute (Aliases) 294a includes information related to usernames or identities owned by an owner of profile 205a on other social media platforms. In some embodiments, the usernames or identities owned by an owner of profile 205a on other social media platforms can greatly accelerate the identification of matches between profiles on various social media platforms by providing a strong indication that two profiles are owned by, used by, or representative of the same person. Additionally, the values of user names or other distinct identifiers in attribute (Aliases) 294a can provide additional search leads for identifying profiles owned by, used by, or representative of the same person but not listed in Attribute (Aliases) 294a.

Attribute (Content) 296a includes information related to content on a social media platform that was created by, read, or responded to by an owner of profile 205a. Some embodiments will generate word frequency distributions for web pages pointed to by attribute (Content) 296a and compare the resulting word frequency distributions as a component in determining the likelihood of a match between profiles on two social media platforms as an indication that the two profiles are owned by, used by, or representative of the same person. In some embodiments, the uniqueness of the content may also be used for ascertaining matches between content. For example, if both two profiles are associated with content about a specific and somewhat unique interest, such as a onetime event at a discrete physical location, then that may raise the probability of a match between profiles.

Attribute (Other) 298a includes information related to profile 205a that may be used by embodiments to compare to profiles, as an indication that the two profiles are owned by, used by, or representative of the same person, and the information contained in attribute (other) 298a will vary between embodiments without departing from the scope and intent of the present disclosure.

While a total of ten attributes have been included in example profile 205a, one of skill in the art will realize, in light of having read the present disclosure, that embodiments discussed herein may operate on profiles containing more or fewer attributes, including some or all of the attributes discussed with respect to profile 205a, without departing from the scope of the embodiments discussed herein.

Figure 2C:
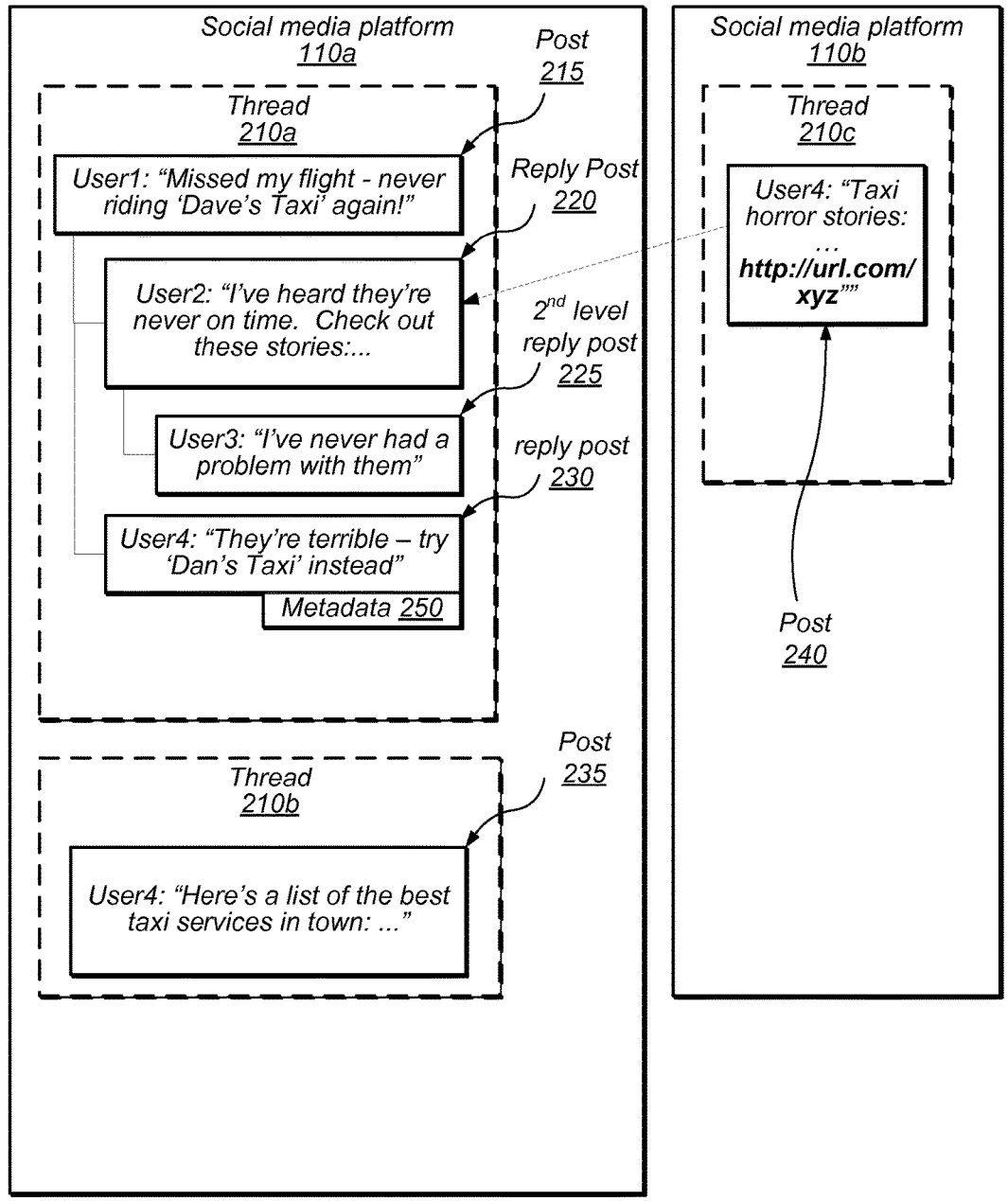
FIG. 2C depicts examples of user-generated content on two social media platforms, according to various embodiments.

FIG. 2C depicts examples of user-generated content on two social media platforms, according to various embodiments. Social media platforms 110a and 110b of FIG. 2C may correspond to social media platforms 110a and 110b in FIG. 1.

According to the illustrated embodiment, social media content may be arranged into multiple conversational threads, such as threads 210a-210c. Each thread may comprise any number of user posts, where each post includes some content, such as text, pictures, video, audio, and/or other types of multimedia. As used herein, the term post may be used to refer both to independent posts (e.g., 215, 235, and 240) and to reply posts (e.g., 220, 225, 230), which are posted in response to other posts. As illustrated in thread 210a, replies in a given thread may be arbitrarily deep.

As indicated in FIG. 2C, each post may contain some content generated by and attributable to a corresponding user of the social media platform. For example, post 215 is a textual comment posted by user1. Each such user may be associated with one or more profiles, such as profiles 205a-205c, profiles 206c-206d and profiles 207b and 207d as discussed above with respect to FIG. 2A. Embodiments may use the content of threads 210a-210c in determining which of profiles 205a-205c, profiles 206c-206d and profiles 207b and 207d as an indication that the two profiles are owned by, used by, or representative of the same person.

As indicated in FIG. 2C, posts on a social media platform may be associated with respective metadata, such as metadata 250. In various embodiments, such metadata may include system generated metadata (e.g., author of the post, time/date of the post) and/or user-specified metadata (e.g., relationships between posts, rating or flagging of the content in a post, etc.). For example, metadata 250 may include indications that reply post 230 is a reply to post 215 and was posted at a given date/time. In addition, metadata 250 may include an indication that User4 is the author of the post, such as by associating post 230 with a unique identifier corresponding to User4.

In various embodiments, users of social media platform 110*a* may determine the author of a given post by viewing various identifying information about the author, such as a unique username, a not necessarily screen name, a picture, and/or other information. This information may then be used as an indication that the two profiles are owned by, used by, or representative of the same person. In different embodiments, different information identifying the author of each post may be programmatically available via different interfaces, such as a Web API.

In some situations, a user of the social media platform may author numerous posts, which may appear in one or more threads. For example, in the illustrated embodiment, User4 is the author of both reply post 230 and of post 235, which appear in threads 210*a* and 210*b* respectively.

In many situations, a user may participate in numerous social media platforms. For example, in the illustrated embodiment, User4 participates in both social media platform 110*a* and 110*b*. Embodiments may ascertain such participation by a single user in multiple social media platforms by monitoring the content of threads 210*a* and 210*b* in spite of the fact that a given user may sometimes have different identifying information across different social media platforms (e.g., different username). According to various embodiments, the social media measurement tool 155 may leverage various user-stitching techniques described herein to ascertain that posts on multiple different social media platforms are actually authored by the same person and/or entity and thereby link profiles belonging to a common owner.

In some embodiments, content in one post may reference another post. For example, post 240 on social media platform 110*b* includes a URL that points to post 220 on social media platform 110*a*. In some situations, a user that embeds a URL in a post (e.g., post 240) may use a URL miniaturization service to reduce the length of the URL. An embedded URL may refer to another post on a different social media platform (as post 240 refers to post 220), to a post on a different thread of the same social media platform, or even to another post on the same thread.

Figure 3:
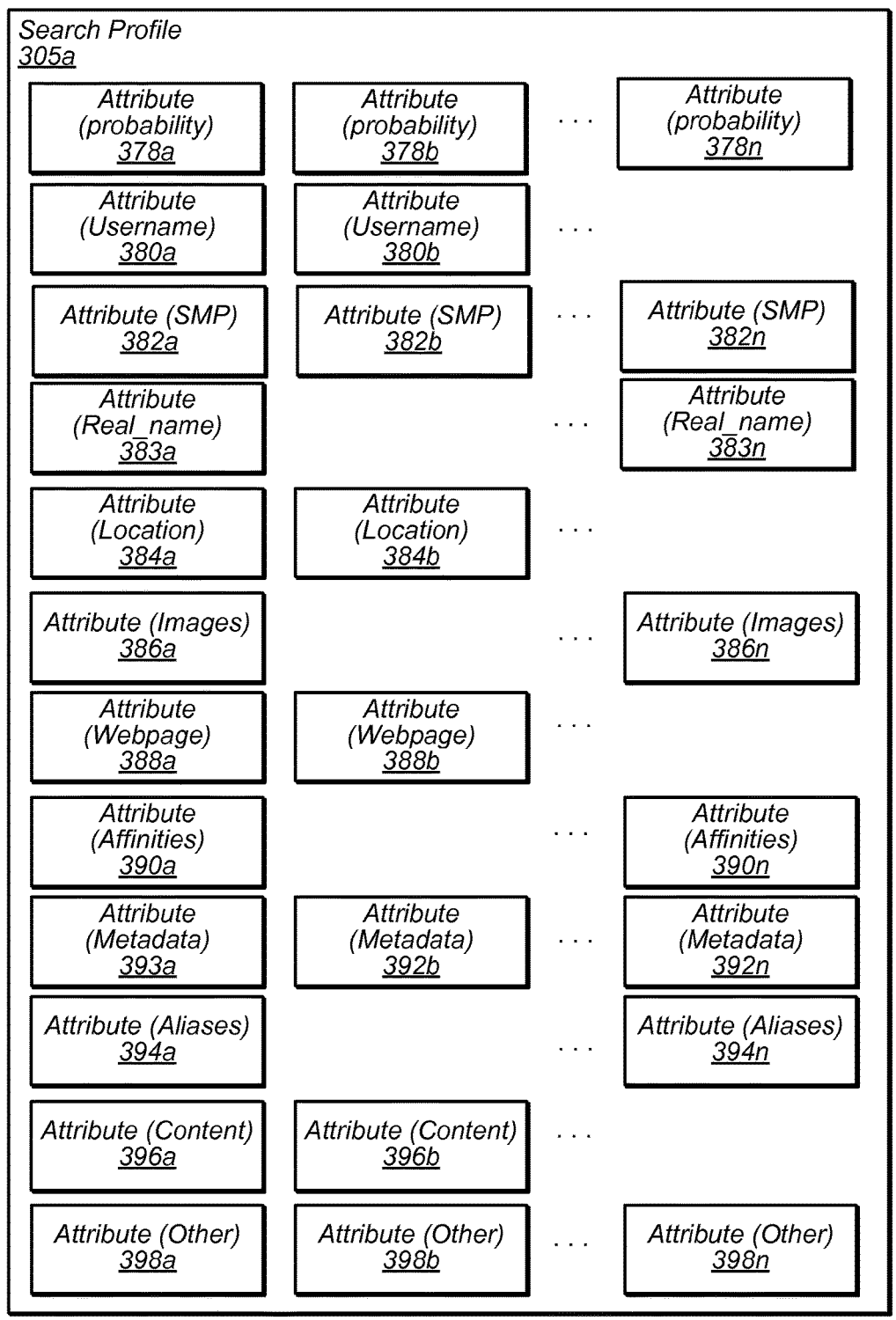
FIG. 3 illustrates an example of a search profile on an example search profile database for use with a social media measurement tool, according to various embodiments.

FIG. 3 illustrates an example of a search profile on an example search profile database for use with a social media measurement tool, according to various embodiments. A search profile 305*a* is a data structure comprising data accumulated with respect to profiles having various probabilities of being associated with the same person. In some embodiments, a search profile 305*a* is initially built at a beginning of an attempt to stitch user profiles together as being owned by, used by, or representative of the same person. In such embodiments, the search profile 305*a* is initially populated with attributes from a profile for which matches are being sought. As additional profiles on additional social media platforms are identified as being owned by, used by, or representative of the same person, search profile 305*a* is further built through the addition of attributes of the profiles identified a being owned by, used by, or representative of the same person associated with the initial profile. In some embodiments, the search profile is entirely omitted. Some such embodiments operate directly on received user profiles.

Within the example embodiment depicted as search profile 305*a*, many, but not all, of attributes 378*a*-398*n* contain information similar to that discussed above with respect to respectively named attributes of FIG. 2B. As shown in FIG. 3, three sets of attributes are included in search profile 305*a*. Attributes 378*a*-398*a* reflect a first profile. Attributes 378*b*-398*b* reflect a second profile that has been identified as potentially being owned by, used by, or representative of the same person associated with the initial profile associated with attributes 378*a*-398*a*. Likewise attributes 378*n*-398*n* reflect a third profile that has been identified as potentially being owned by, used by, or representative of the same person associated with the initial profile associated with attributes 378*a*-398*a*.

One skilled in the art will realize, in light of having read the present disclosure, that an arbitrary number of profiles may be represented by attributes 378*a*-398*n* without departing from the scope and intent of the embodiments disclosed herein. Further, one of skill in the art will note that available attributes 378*a*-398*n* vary between particular ones of group of attributes 378*a*-398*a*, attributes 378*b*-398*b*, and attributes 378*n*-398*n*, reflecting the fact that, in some embodiments, search profile 305*a* will flexibly accommodate differences in available attributes present in the social media profiles represented by group of attributes 378*a*-398*a*, attributes 378*b*-398*b*, and attributes 378*n*-398*n*.

In one embodiment, each group of attributes 378*a*-398*a*, attributes 378*b*-398*b*, and attributes 378*n*-398*n* contains one of attributes (probability) 378*a*-378*n*. Attribute (probability) 378*a* will, in some embodiments, be set to 100% to identify attributes 378*a*-398*a* as characterizing a first social media profile for which matches are to be sought. Each of attributes (probability) 378*b*-378*n* will be set to a value reflecting a calculated or determined probability that the respective profile is related to the profile associated with attribute (probability) 378*a*.

Attributes (Username) 380*a*-380*n* include user identifiers associated with respective ones of profiles from which each of groups of attributes 378*a*-398*a*, attributes 378*b*-398*b*, and attributes 378*n*-398*n* is drawn. Use of attributes (Username) 380*a*-380*n* for profile matching is similar to that discussed above with respect to attribute (username) 280*a* of FIG. 2B. Attributes (SMP) 382*a*-382*n* indicate social media platforms on which respective ones of profiles from which each of groups of attributes 378*a*-398*a*, attributes 378*b*-398*b*, and attributes 378*n*-398*n* are drawn.

Attributes (Real_Name) 383*a*-383*n* include user identifiers associated with respective ones of accounts represented by profiles from which each of groups of attributes 378*a*-398*a*, attributes 378*b*-398*b*, and attributes 378*n*-398*n* is drawn. Use of attributes (Real_Name) 383*a*-383*n* for profile matching is similar to that discussed above with respect to attribute (Real_Name) 282 of FIG. 2B.

Attributes (Location) 384*a*-384*b* include information related to the physical locations of respective users. Attributes (Location) 384*a*-384*b* may be used by some embodiments to determine the likelihood of a match between profiles on two social media platforms, as an indication that respective ones of profiles from which each of groups of attributes 378*a*-398*a*, attributes 378*b*-398*b*, and attributes 378*n*-398*n* is drawn are owned by, used by, or representative of the same person. Use of attributes (Location) 384*a*-384*b* for profile matching and content of attributes (Location) 384*a*-384*b* are similar to that discussed above with respect to attribute (Location) 284*a* of FIG. 2B.

Attributes (Content) 396*a*-396*b* include information related to content on a social media platform that was created by, read, or responded to by owners of respective ones of profiles from which each of groups of attributes 378*a*-398*a*, attributes 378*b*-398*b*, and attributes 378*n*-398*n* is drawn. Use of attributes (Content) 396a-3396b for profile matching is similar to that discussed above with respect to attribute (Content) 296a of FIG. 2B.

Attributes (Images) 386a-386n include information related to images associated with profiles from which each of groups of attributes 378a-398a, attributes 378b-398b, and attributes 378n-398n is drawn. Use of attributes (Images) 386a-386n for profile matching is similar to that discussed above with respect to attribute (Images) 286a of FIG. 2B.

Attributes (Webpage) 388a-388b include information related to web pages associated with profiles from which each of groups of attributes 378a-398a, attributes 378b-398b, and attributes 378n-398n is drawn. Use of attributes (Webpage) 388a-388b for profile matching is similar to that discussed above with respect to attribute (Webpage) 288a of FIG. 2B.

Attributes (Affinities) 390a-390n includes information related to the biography or commercial proclivities of a user of profiles from which each of groups of attributes 378a-398a, attributes 378b-398b, and attributes 378n-398n is drawn. Use of attributes (Affinities) 390a-390n for profile matching is similar to that discussed above with respect to attribute (Affinities) 290a of FIG. 2B.

Attributes (Metadata) 393a-393n includes information related to system activities undertaken by a user associated with profiles from which each of groups of attributes 378a-398a, attributes 378b-398b, and attributes 378n-398n is drawn. Use of attributes (Metadata) 393a-393n for profile matching is similar to that discussed above with respect to attribute (Metadata) 292a of FIG. 2B.

Attributes (Aliases) 394a-394n includes information related to usernames or identities on other social media platforms owned by an owner of profiles from which each of groups of attributes 378a-398a, attributes 378b-398b, and attributes 378n-398n is drawn. Use of attributes (Aliases) 394a-394n for profile matching is similar to that discussed above with respect to attribute (Aliases) 294a of FIG. 2B.

Attributes (Content) 396a-396b includes information related to content on a social media platform that was created by, read, or responded to by an owner of profiles from which each of groups of attributes 378a-398a, attributes 378b-398b, and attributes 378n-398n is drawn. Use of attributes (Content) 396a-396b for profile matching is similar to that discussed above with respect to attribute (Content) 296a of FIG. 2B.

Attributes (Other) 398a-398n includes information related to profiles from which each of groups of attributes 378a-398a, attributes 378b-398b, and attributes 378n-398n is drawn. Such information may be used by embodiments to compare to profiles, as an indication that the two profiles are owned by, used by, or representative of the same person, and the information contained in attributes (other) 398a-398n will vary between embodiments without departing from the scope and intent of the present disclosure. Use of attributes (other) 398a-398n for profile matching is similar to that discussed above with respect to attribute (Other) 298a of FIG. 2B.

Figure 4A:
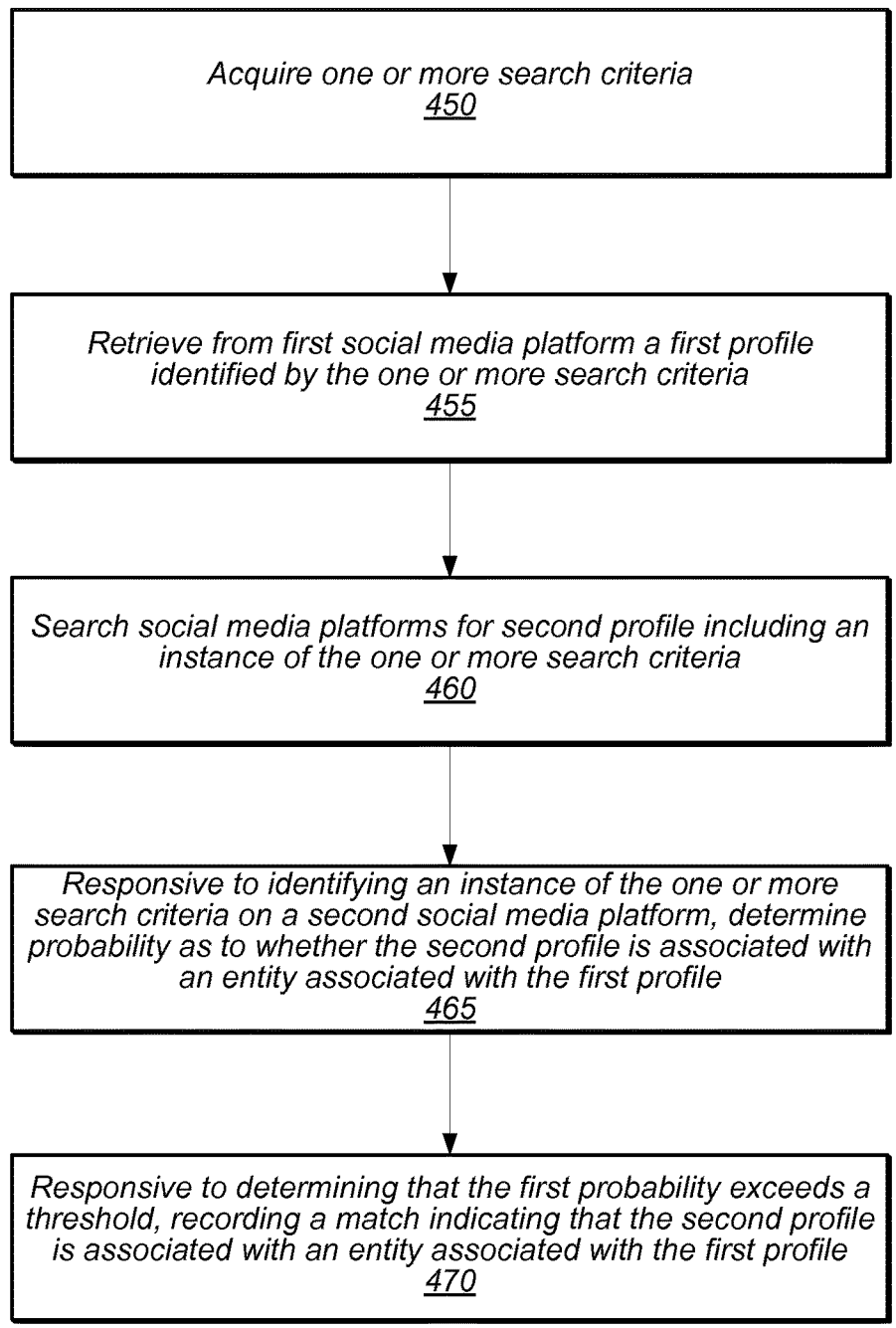
FIG. 4A depicts a flow diagram illustrating operations performable in identifying, aggregating, and analyzing user profiles on one or more social media platforms based on one or more search criteria, according to various embodiments.

Operations and Tools for Use of Social Media Profiles in Targeting Communications FIG. 4A depicts a flow diagram illustrating operations performable in identifying, aggregating, and analyzing user profiles on one or more social media platforms based on one or more search criteria, according to various embodiments. One or more search criteria are acquired (block 450). In some embodiments, the search criteria include user identifiers, but search criteria vary widely between embodiments without departing from the scope and intent of the present disclosure, and any attribute or attributes of profiles or content discussed with respect to FIGS. 2A-2C may be included in search criteria without departing from the scope and intent of the disclosed embodiments. A first profile identified by the one or more search criteria is retrieved from a first social media platform (block 455).

A plurality of social media platforms are searched for a second profile including an instance of the one or more search criteria (block 460). Responsive to identifying an instance of the one or more search criteria on a second social media platform, a probability as to whether the second profile is associated with an entity associated with the first profile is determined (block 465). In some embodiments, determining the first probability comprises comparing an attribute of the first profile to an attribute of the second profile. Responsive to determining that the first probability exceeds a threshold, a match indicating that the second profile is associated with an entity associated with the first profile is recorded (block 470).

Figure 4B:
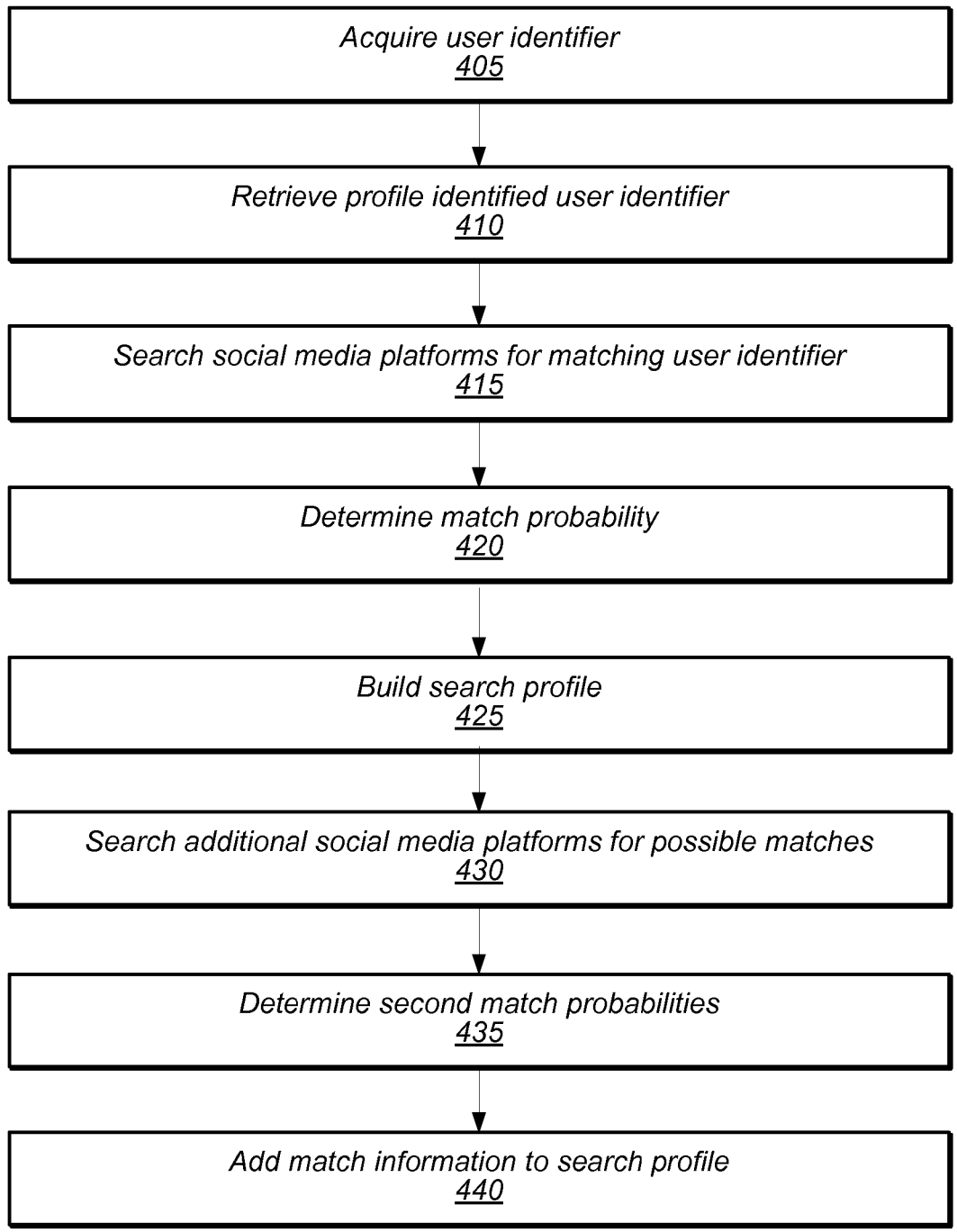
FIG. 4B depicts a flow diagram illustrating operations performable in identifying, aggregating, and analyzing user profiles on one or more social media platforms based on user identifiers, according to various embodiments.

FIG. 4B depicts a flow diagram illustrating operations performable in identifying, aggregating, and analyzing user profiles on one or more social media platforms, according to various embodiments. A user identifier is acquired (block 405). A profile associated with the user identifier is retrieved (block 410). In some embodiments, retrieving the profile associated with the user identifier includes the profile from a first social media platform, such as social media platforms 110a-110n described above with respect to FIG. 1. Social media platforms are searched for profiles with user identifiers matching the user identifier (block 415). A match probability is determined for a second profile with a user identifier matching the user identifier being searched (block 420). More specifically, in some embodiments, responsive to identifying an instance of the user identifier on a second social media platform, a first probability is determined. The second profile is identified by the instance of the user identifier on the second social media platform. The first probability predicts whether the second profile is associated with a person associated with the first profile, and the determining the first probability further includes comparing an attribute or attributes of the first profile to an attribute of the second profile;

A search profile is built (block 425). Building the search profile can include creation of a search profile from the two matched profiles or adding attributes from the second search profile to a search profile already created with attributes from the first search profile. Additional social media platforms are searched for possible matching profiles (block 430). One or more second match probabilities are determined for possible matching profiles (block 435).

More specifically, in some embodiments, responsive to identifying an instance of the user identifier on a third social media platform, a second probability is determined. The second probability predicts whether the third profile is associated with the person associated with the first profile, and the determining the second probability includes comparing one or more attributes of the search profile to one or more corresponding attributes of the third profile. In some embodiments Information from probable matches is added to a search profile (block 440). More specifically, in some embodiments, responsive to determining that the first probability exceeds a threshold, one or more attributes of the second profile are added to the search profile.

In some embodiments, the measurement tool may be configured to identify additional keywords by performing steps 410-440 recursively, each time using data extracted from additional profiles identified as probable matches in the previous iteration. For example, after performing a first iteration of the operations listed in block 410, the measurement tool may identify new profiles owned by a given user and then repeat steps 410-440 using attributes extracted from those profiles instead of (or in addition to) those attributes used from the original profile. Using this recursive approach, the measurement tool may discover additional and/or yet more relevant profiles. In various embodiments, iterations may terminate upon executing a predefined number of iterations, after a given iteration does not identify any new profiles and/or another condition is met.

Figure 5:
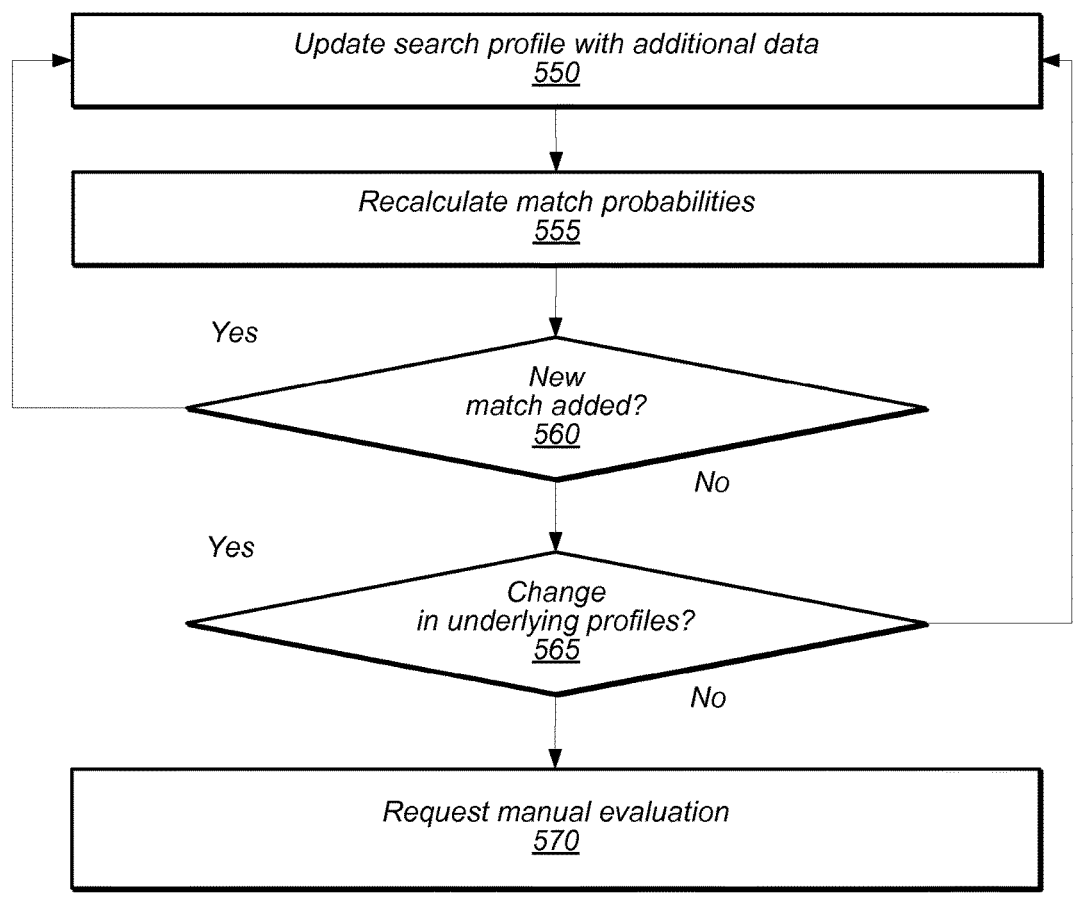
FIG. 5 illustrates a flow diagram depicting operations performable in iteratively identifying, aggregating, and analyzing user profiles on one or more social media platforms, according to various embodiments.

FIG. 5 illustrates a flow diagram depicting operations performable in iteratively identifying, aggregating, and analyzing user profiles on one or more social media platforms, according to various embodiments. A search profile is updated with additional data (block 550). Match probabilities are recalculated (block 555). A determination is made as to whether a new match has resulted from the recalculation of match probabilities (block 560). If such a new match has resulted from the recalculation of match probabilities, the process returns to block 550. Otherwise, a determination is made as to whether the profiles underlying match probabilities have changed (block 565). If such changes to the profiles underlying match probabilities have occurred, the process returns to block 550. Otherwise, manual match evaluations are requested (block 570).

Figure 6:
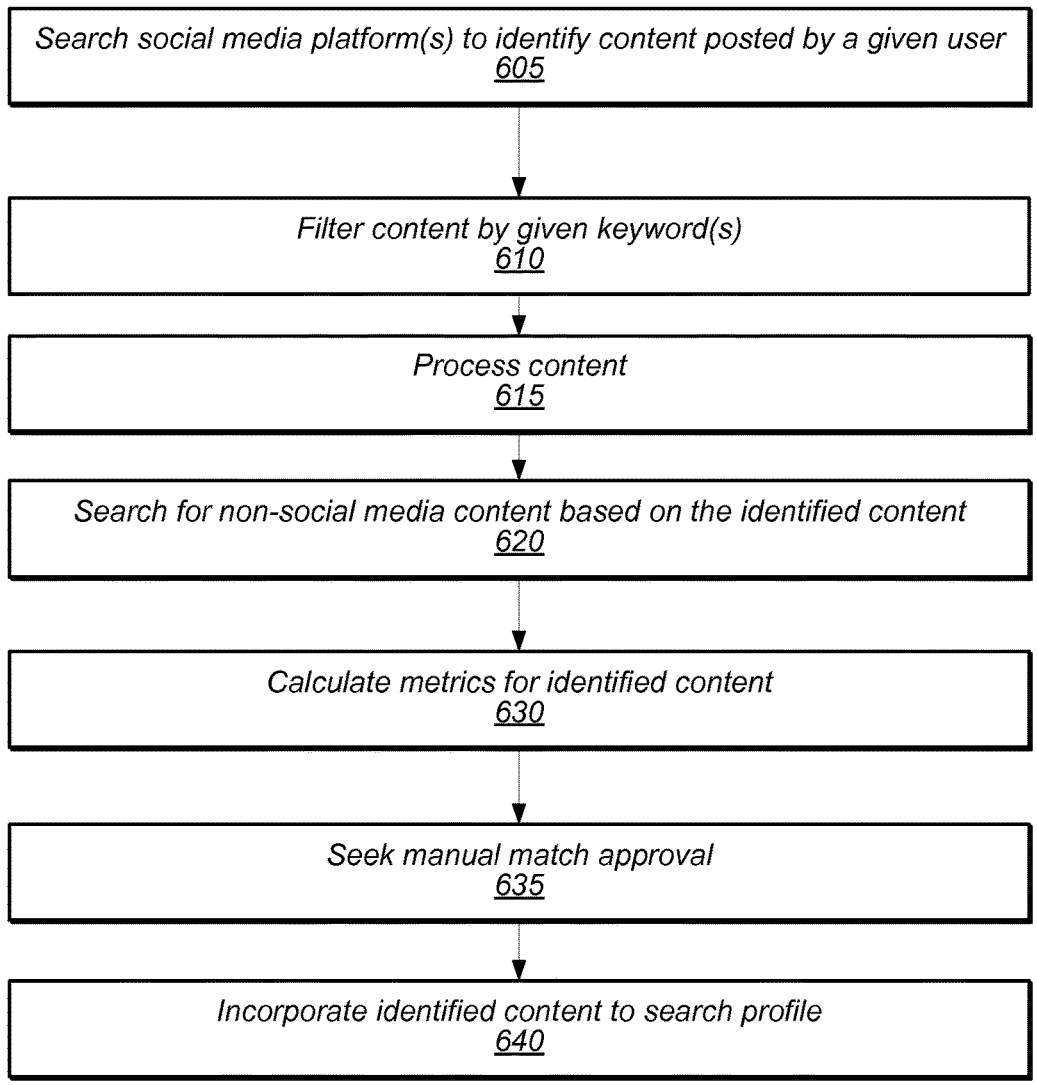
FIG. 6 depicts a flow diagram illustrating operations performable in identifying, aggregating, and analyzing user profiles based on non-profile content on one or more social media platforms, according to various embodiments.

FIG. 6 depicts a flow diagram illustrating operations performable in identifying, aggregating, and analyzing user profiles non-profile content on one or more social media platforms, according to various embodiments. Social media platforms are searched to identify content, such as threads and thread replies, posted by a given user (block 605). Content is filtered based on a set of given keywords (block 610). Content is processed (block 615). Examples of content processing include the creation of word frequency distributions and analysis of writing styles of users, as well as hashes of images. A search is performed for non-social media content based on the identified content (block 620). In one embodiment, searches of non-social media content include general web searches for pages, such as news stories or advertisements (e.g., professional profiles on company websites) providing information about individuals matching relevant attributes of a search profile. Metrics are calculated for the identified content (block 630). In one embodiment, such metrics will include calculations of the probability that the content identified and processed in blocks 605-620 corresponds to the owner of profiles associated with a search profile. Manual match approval is (optionally) sought for matches (block 635). Identified content is added to a search profile (block 640).

Figure 7:
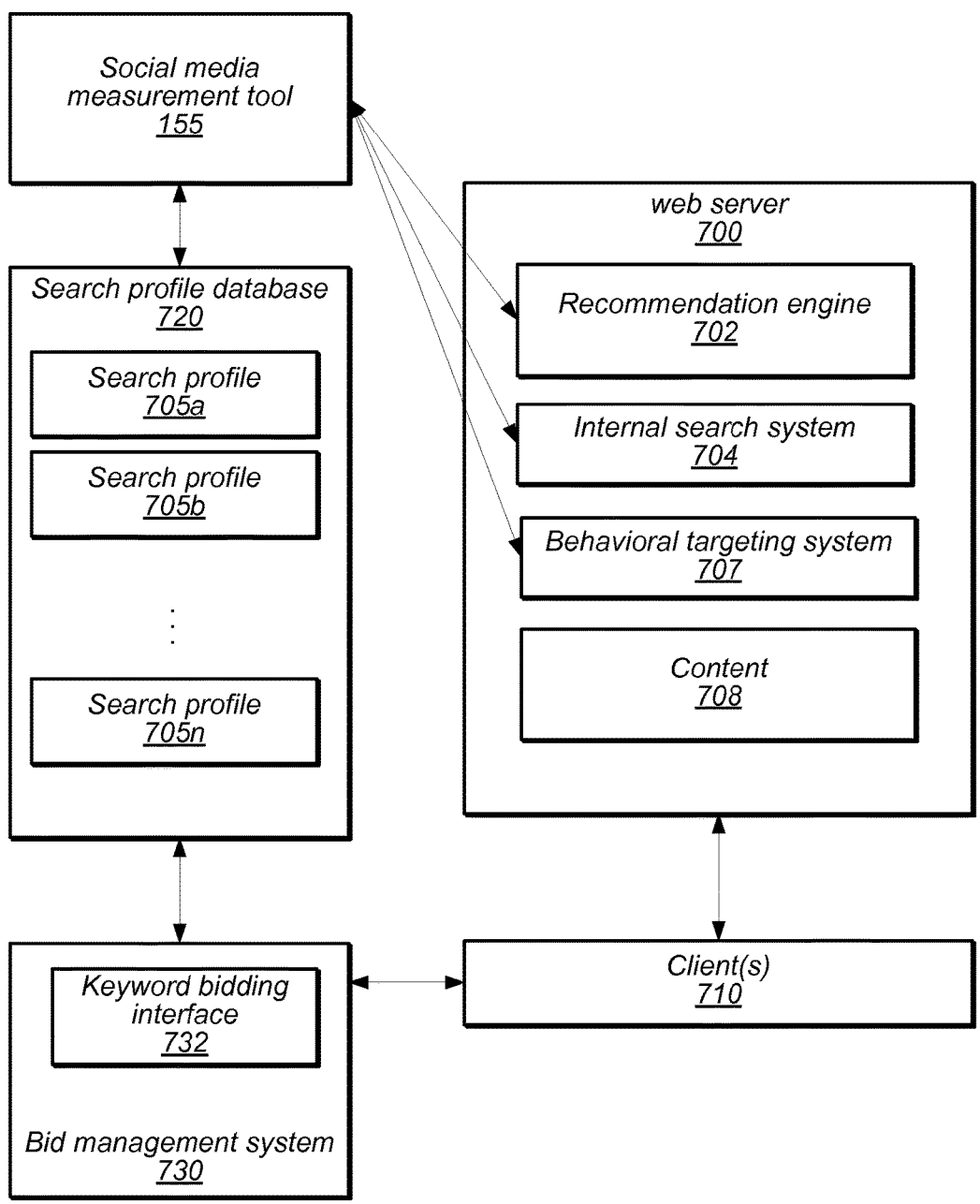
FIG. 7 is a block diagram illustrating a social media measurement tool and a variety of components configured to utilize the social media measurement tool, according to various embodiments.

FIG. 7 is a block diagram illustrating a social media measurement tool and a variety of components configured to utilize the social media measurement tool, according to various embodiments. In the illustrated embodiment, any of the depicted components (700-732 and/or 155) may be executing on a separate or the same physical machine. For example, in some embodiments, social media measurement tool 155 may be installed as a software component on the same physical server as either web server 700 and/or as search profile database 720. In another embodiment, social media measurement tool 155 may execute as a service on a separate physical server that is accessible by either web server 700 or search profile database 720 from across a network (e.g., Internet, Local Area Network, etc.). In the latter example, web server 700, search profile database 720, and/or various other clients of the social media measurement tool 155 may be configured to request social media measurements from the tool using various query mechanisms and/or interfaces (e.g., web services API). As such, social media measurement tool 155 may be implemented as wide-area network service, which may service requests from different client machines, in different administrative domains, and/or owned by different entities.

For purposes of clarity the embodiment illustrated in FIG. 7 is explained assuming that each component (measurement tool 155, search profile database 720, web server 700, search engine 730, and clients 710) is executing on a different respective computer and that the computers are configured to communicate with one another over a network. The arrows connecting the illustrated components signify communications, any of which may take place across one or more networks (e.g., Internet, LAN, WAN, etc.). However, given the benefit of this disclosure, those skilled in the art will recognize that in different embodiments, various ones of the components depicted in FIG. 7 may be executing on the same or different physical or virtual machines.

According to some embodiments, web server 700 may be configured to serve web pages to clients (e.g., 710) over a network. For example, web server 700 may be configured to implement an e-commerce website where clients 710 may browse and purchase products. The web server 700 may be configured to serve content 708 at least in part, by executing various components and/or applications, such as recommendation engine 702 and internal search system 704. Such components may be implemented as components of a web application or as separate components. During operation, each of recommendation engine 702 and internal search system 704 may query or otherwise interact with social media measurement tool 155 to obtain social media measurements during the course of their operation.

Consider for example, recommendation engine 702. Many companies use recommendation engines, such as 702, to provide applicable recommendations to users. Such recommendations may traditionally be based on the items the user has already purchased or viewed, taking into account correlations the company has observed between purchases made by other users. However, traditional approaches are limited in that correlations are only built on local data, which may be biased by site configuration and/or may be insufficient for making meaningful recommendations because the local data is based only on a local profile.

In some embodiments, search profile database 720 executes functions related to the management of one or more search profiles 705, such as match identification, profile building, and responses to queries from social media measurement tool 155 and search engine 730. Exact distribution of the functions described in the present disclosure between search profile database and social media measurement tool 155 will vary between embodiments, and, in some embodiments, search profile database may be implemented as a component of social media measurement tool 155.

According to various embodiments, recommendation engine 702 may be configured to communicate with social media measurement tool 155 to gain insight into attributes of multiple profiles belonging to a single user and thereby recommend products based on attributes of the multiple matched profiles, such as affinities listed in the profiles or content created by the user of the matched profiles. For example, in some embodiments, an administrator of recommendation engine 702 may associate one or more keywords with each product available for sale on the e-commerce site hosted by web server 700. When recommendation engine 702 needs to determine one or more products to recommend but lacks sufficient data with which to form such a recommendation, the engine may query social media measurement tool 155 for profile data relevant to each of the keywords associated with different possible products and related to the user to whom a recommendation is being made. In response, the measurement tool 155 may collect and analyze profile data from multiple matched profiles related to each of the keywords and send such data, metrics, or analysis to recommendation engine 702. Recommendation engine 702 may use the received data to determine which product to recommend. For example, in some embodiments, recommendation engine 702 may calculate a "content" score for each keyword or collection of keywords associated with each product based on content attributes associated with each user profile belonging to the user. Recommendation engine 702 may then use these metrics to calculate a content score for each product and recommend the products with the top content scores. Some embodiments will calculate a similar metric for affinities.

For example, suppose a bookstore website includes a recommendation engine configured to recommend additional products to users who have already purchased books on the site. These recommendations may correspond to books similar to ones the user has already bought previously on the site. However, if the user has only purchased a brand new book, the system may have no product history and may not be able to provide a recommendation tailored to this user. According to various embodiments, the system may query social media measurement tool 155 using sets of keywords that correspond to different books available on the site. If the tool reports that the user is posting content related to "Harry Potter" under several profiles on various social media platforms in the last month, then the recommendation engine may recommend the newest Harry Potter book to the user.

In some embodiments, the web server (or a different web server) may include an internal search system, such as 704. Websites often include internal search functionality that allows users to enter a keyword or phrase and be presented with a list of search results (e.g., content) from the website that are related to the given keyword or phrase. The order in which these results are displayed may influence which result the user will select and therefore affects which section of the site the user will visit. It may be desirable for internal search system 704 to present the results in an order that will drive the most conversion (e.g., most sales) on the site based on data from multiple profiles belong to the user.

According to various embodiments, internal search system 704 may query social media measurement tool 155 to determine user interests, which the search system may use in determining an order for presenting search results. In some embodiments, this process may be similar to that used by recommendation engine 702. For example, an administrator of internal search system 704 may associate one or more respective keywords with different sections of the web site (e.g., with each page, group of web pages, portion of a web page, etc.). When a user performs a search, internal search system 704 may retrieve the search results, determine the keywords associated with each retrieved result, and query social media measurement tool 155 to determine the respective levels of interest from the user (as derived from multiple matched profiles) regarding each set of keywords. Internal search system 704 may then present the search results to the user in an order dependent on the determined levels of interest as derived from multiple matched profiles.

For example, consider a retail clothing store website that includes an internal product search system that allows users to search for various products matching different keywords and be presented with related products being sold on the site. According to some embodiments, the user may enter the search term "jeans", and the internal search system may respond by retrieving a standard set of product results related to that word. Then, the search system may query social media measurement tool 155 for the keywords associated with each site section on which the results reside. If, for example, the term "Jean shorts" has the most mentions in content read by the user through multiple profiles on multiple social media platforms for the last week, then search results on a site section associated with the term "Jean shorts" may be displayed earlier on the search results page than are other search results on sections associated with less popular keywords.

In some embodiments, web server 700 (or a different web server) may include a behavioral targeting system 706. Companies may use behavioral targeting system 706 to serve applicable content to users based on previous user behavior both on a website served by web server 700 and on websites hosting other profiles associated with the same user. As users continue to use a website, behavioral targeting system 706 may learn more about the user and provide content (e.g., advertisements) that is better tailored to that particular user, based on the user's behavior. However, at times, the system may not know much about the user (e.g., the user's first visit) based solely on the user's interaction with the web site hosted by web server 700.

According to some embodiments, behavioral targeting system 706 may query the social media measurement tool 155 to gauge the user's interest in different servable content, according to profile information from several profiles. As with the internal search system, in some embodiments, an administrator may associate each portion of content servable by behavioral targeting system 706 with one or more keywords. When behavioral targeting system 706 attempts to determine which portion of content to serve (e.g., needs to choose a banner advertisement to serve in a pre-defined space), behavioral targeting system 706 may query social media measurement tool 155 with the keywords associated with potential content. As with recommendation engine 702 and internal search system 704, behavioral targeting system 706 may choose to serve the content that is most relevant to the user's interest, as indicated by the response data sent by social media measurement tool 155 based on attributes of multiple profiles belonging to the user.

For example, consider a banking website that includes a large piece of screen real estate reserved for targeted advertisements on a given page. The displayed advertisement could include any of the several different products or services offered by the bank, depending upon the user's interests and history. However, for a first-time visitor, the system may not have a user history. According to some embodiments, in such a situation, behavioral targeting system 706 may use results of a search of profiles belonging to the user by social media measurement tool 155 on sets of keywords that correspond to different advertisements available to serve. So for example, if the measurement tool indicates that the keyword "refinance" is a highly popular keyword in content viewed by the user over the last month on several social media platforms, the behavioral targeting system may serve to the user an advertisement for refinancing.

Another example of a system that may be configured to utilize social media profile matching to form measurements provided by measurement tool 155 may be a bid management system 730. A popular form of advertising for many companies is Search Engine Marketing (SEM) where the company purchases various keywords or phrases from a search engine, such as search engine 730 (e.g., Google™, Yahoo™, etc.) and associates different advertisements with the purchased keywords. When the search engine receives client requests to search for one or more of the purchased keywords, it may serve one or more of the advertisements as part its response.

Often, such search engines allow advertisers to purchase keywords by bidding on them via a keyword bidding interface, such as keyword bidding interface 732. When serving advertisements that match the keywords, the search engine may choose to serve only a limited number of advertisements, which correspond to the highest bids for the particular keywords. Furthermore, the order in which the advertisements appear on a search page may also be dependent on the respective bid amounts. Some search engines employ even more complex schemes, whereby the advertisers pay respective amounts for impressions of a given advertisement (the number of times the given advertisement is shown) and for clicks on the advertisements (the number of times a user follows a link associated with the advertisement to view the advertised content). Therefore, advertisers are interested in evaluating keyword purchases, discovering the most effective keywords, and discovering an optimal bid price for them.

Advertisers sometimes use bid management systems, such as 730, to automatically track the effectiveness of bids and bid on new keywords. For example, bid management system 730 may be configured to track the costs associated with purchasing each keyword and the revenue generated on an advertised website as a result of purchasing the keyword. Bid management system 730 may then report these metrics to the advertiser, suggest bid amounts for each keyword, and/or bid on particular keywords automatically.

According to various embodiments, bid management system 730 may be configured to consider social media measurements based on matched profiles of users expected to be shown a particular advertisement when evaluating various keywords on which to bid. For example, bid management system 730 may be configured to track a given set of keywords on which the user is currently bidding or on which the user is considering bidding and ascertain aggregate profile characteristics of the users to which advertisements related to the keyword are being shown. Such keywords may be referred to herein as SEM keywords.

The bid management system may be configured to query social media measurement tool 155 or search profile database 720 for respective measurements regarding various ones of the SEM keywords that the bid management system is tracking, including profile information for users being shown ads associated with the keyword. The bid management system may then present the respective measurements to a user to inform the user's bidding decisions. For example, for different SEM keywords, the bid management system may present such social media measures as the affinities of users to whom ads associated with a keyword are being shown, content of relevant posts (e.g., those that contain the keyword plus downstream posts relevant to those) by users to whom ads associated with a keyword are being shown, social media platforms of users to whom ads associated with a keyword are being shown, or various other ones of the attributes discussed above. In some embodiments, the bid management system may further combine/process the information gathered from social media measurement tool 155 to derive other relevant measures of effectiveness for each keyword based on user profiles.

In various embodiments, the bid management system may present such metrics to a user according to different organizations. For example, bid management system 730 may break out the measures according to each keyword, respective collections of keywords in different advertising campaigns, respective groups of keywords being bid on at different search engines, user-specified collections of keywords, and/or any other groupings that may help the user determine appropriate bidding behavior.

In some embodiments, bid management system 730 may utilize the social media measurements acquired from social media measurement tool 155 (or measures derived from those acquired from the measurement tool) to determine whether to automatically bid on various keywords, whether to increase or decrease bid amounts on various keywords, or whether to otherwise modify automatic bid behavior. For example, the bid management system may be configured to enforce a policy whereby it would automatically increase a bid amount of a keyword if it determines that the keyword is receiving a significant spike in social traffic.

In addition to discriminating between different possible SEM keywords, in some embodiments, bid management system 730 may be configured to utilize social media measurements based on multiple matched profiles belonging to users to discover new SEM keywords applicable to those users. Using this functionality, advertisers may discover new keywords on which to bid and/or on which a bid management system may automatically bid in response to knowledge of the identities of their existing users.

Figure 8A:
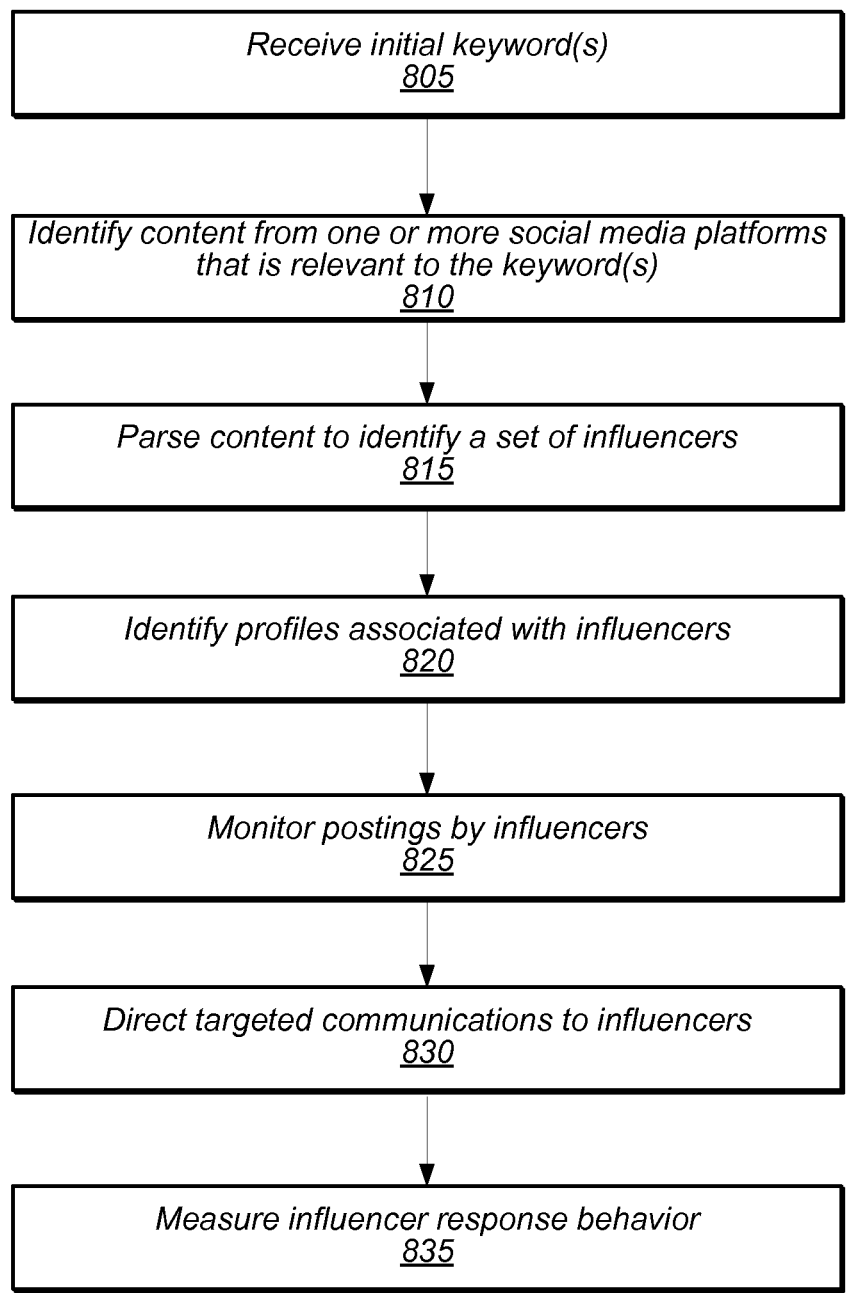
FIG. 8A is a flow diagram illustrating a method for using social media profiles to direct targeted content to users according to various embodiments.

FIG. 8A is a flow diagram illustrating a method for using social media profiles to direct targeted content to users according to various embodiments. For purposes of explanation, the description below describes an embodiment in which a social media measurement tool performs the described operations. However, in other embodiments, such operations may be performed in whole or part by a social media measurement tool (e.g., social media measurement tool 155 of FIG. 1), by a bid management system (e.g., bid management system 730 of FIG. 7), or a combination thereof. Additionally, in various embodiments, asocial media measurement tool may perform the described operations to direct targeted content to users from social media data for purposes other than SEM keyword bid management.

As presented in FIG. 8A, the measurement tool receives one or more initial keywords (block 805). In some embodiments, these keywords may correspond to SEM keywords received from a bid management system, such as those SEM keywords on which a user of the bid management system is currently bidding.

The measurement tool may use the keywords to identify content on one or more social media platforms that is relevant to the keywords received in block 805 (block 810). The content identified in block 810 may comprise directly relevant content and/or relevant downstream content as described above.

The measurement tool may then parse the content identified in block 810 to identify a set of influencers who have significant influence over content on the various social media platforms related to the keywords (block 815). The tool may then identify sets of multiple profiles associated with each of the identified influencers (block 820).

The measurement tool may then monitor postings associated with the profiles of the influencers (block 825). For example, in some embodiments, the tool may monitor changes in content associated with the profiles belonging to particular identified users. Targeted communications may then be directed to the influencers (block 830). Influencer response behavior may then be measured by monitoring changes in the content associated with selected profiles (block 835). In some embodiments, measurement of influencer response behavior may include calculation of metrics designed to measure the effectiveness of the targeted communications directed to the influencers.

In some embodiments, the measurement tool may be configured to identify additional relevant keywords or additional influencers by performing steps 805-835 recursively, each time using measures of effectiveness identified in the previous iteration at block 835.

Figure 8B:
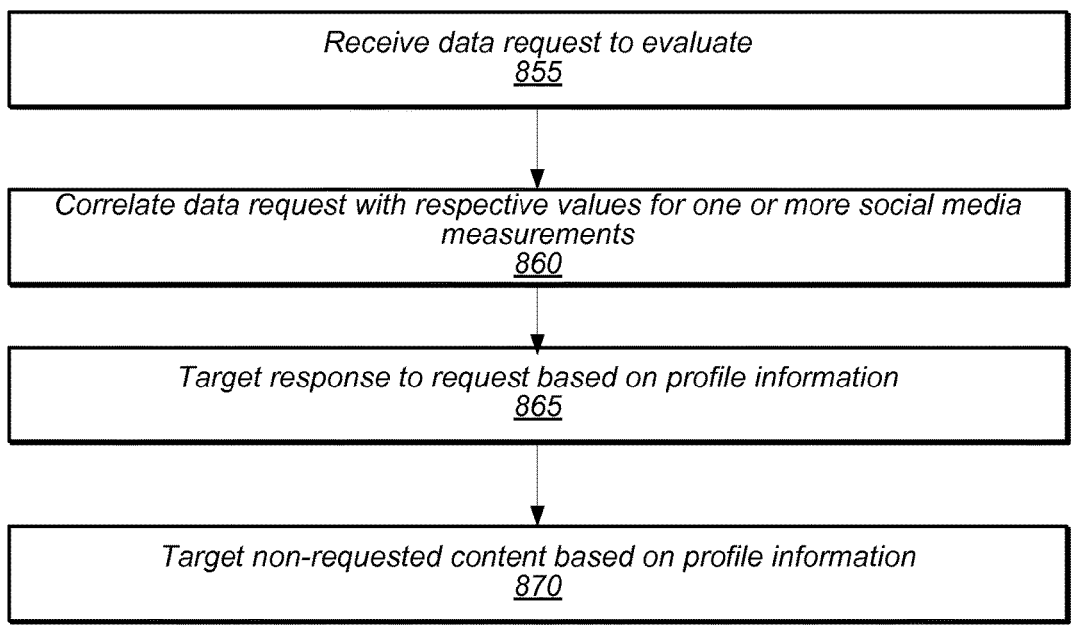
FIG. 8B is a flow diagram illustrating a method for adjusting content sent to users on the basis of social media profiles, according to various embodiments.

FIG. 8B is a flow diagram illustrating a method for adjusting content sent to users on the basis of social media profiles, according to various embodiments. A data request is received for evaluation (block 855). Such a data request may generically be an HTTP get request directed to a web server by a requestor for a particular page or may more specifically be a search query by a requestor for items related to a particular keyword. For example, these keywords may correspond to a group of SEM keywords that a user of the system, other than the requestor, is tracking or targeting content to, as described above with respect to FIG. 8A.

The data request is correlated with respective values for one or more social media measurements (block 860). For instance, the identity of the requestor can be compared to a list of profiles identified to belong to influencers, and targeting of content can be undertaken if a correlation between the identity of the requestor and a profile of a known influencer is discovered.

A response to the request is targeted based on profile information (block 865). That is, for each received keyword, the system may identify one or more pieces of content relevant to the received keyword that a user wishes to see delivered to a known influencer, and requested content targeted to the profile is provided.

Non-requested content is targeted based on profile information (block 870). For example, for each received keyword, the system may identify one or more comparable keywords whose social media measurements are similar to those of the received keyword. In some embodiments, the comparable keywords may correspond to those on which the bid management system is currently bidding, has bid in the past, or for which the bid management system can otherwise obtain SEM metrics (e.g., return on advertising spend), and requested content targeted to the profile is provided.

Figure 9:
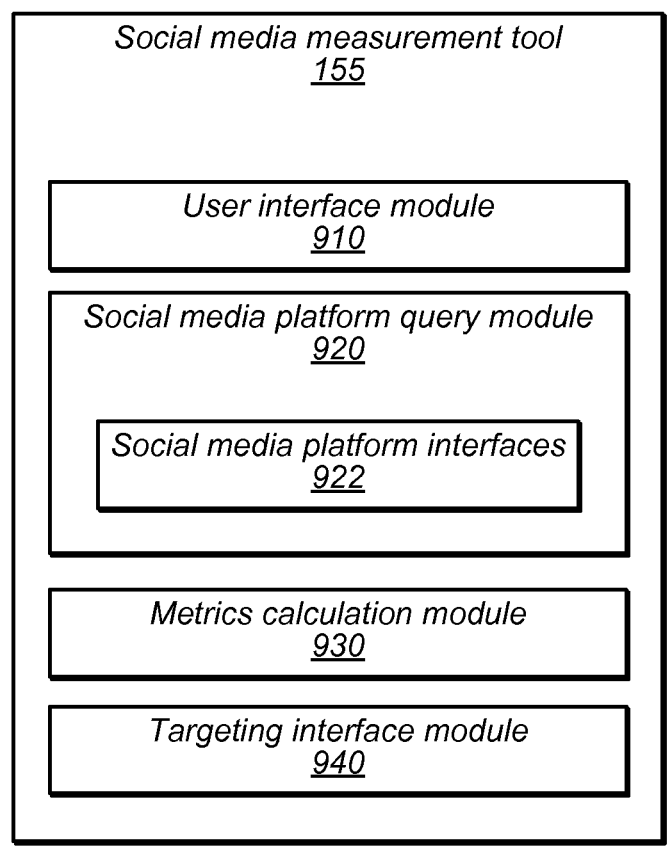
FIG. 9 is a block diagram illustrating the various components of a social media measurement tool, according to some embodiments.

FIG. 9 is a block diagram illustrating the various components of a social media measurement tool 155, according to some embodiments. FIG. 9 illustrates a configuration of only some embodiments; in other embodiments, the measurement tool 155 may include fewer or additional components. Various ones of the illustrated components may be combined or separated further into additional components.

According to the illustrated embodiment, social media measurement tool 155 may include a user interface module, such as 910. The user interface module may be configured to display a graphical user interface to a user and to accept input from the user. The particular nature and/or arrangement of the graphical user interface may depend on the particular implementation of the social media measurement tool. For example, if the tool is implemented as a web application, user interface module 910 may be configured to receive HTTP requests from clients, to compose HTML responses that describe a user interface, and to return those responses to the user. The user interface may then be displayed by a web browser on the user's machine. In other embodiments, if the measurement tool is implemented as a web service, then user interface module 910 may be configured to receive HTTP requests (e.g., web services invocation) and to send back HTTP responses that may not describe a graphical user interface. In yet other embodiments, the social media measurement tool may be implemented as a local, stand-alone application. In such embodiments, the user interface module 910 may implement a local graphical user interface, which may detect user input events generated by the user. In some embodiments, user interface module may be configured to receive requests for data, such as from bid management system 720 or web server 700, including recommendation engine 702, internal search system 704, and/or behavioral targeting system 706.

According to the illustrated embodiment, social media measurement tool 155 may also include social media platform query module 920. Query module 920 may be configured to query one or more social media platforms using one or more social media platform interfaces, such as 922. Interfaces 922 may each correspond to a respective social media platform, which the interface may query using one or more of the social media platform's interfaces, such as interfaces 115 of platform 110a in FIG. 1. For example, interfaces 922 may include a Web API interface for querying the social media platform Facebook™, via a web services interface of that platform. Thus, social media platform query module 920 may query various social media platforms to identify content that is relevant to various keywords, as described herein.

In the illustrated embodiment, measurement tool 155 includes a metrics calculation module 930, which may be configured to calculate and determine different measurements of given social media content, as described herein, including the likelihood of matches between profiles. For example, metrics calculation module 930 may analyze profiles retrieved by query module 920 to determine values for various social media measurement metrics that indicate that two profiles share a common owner, as described herein.

Social media measurement tool 155 also includes targeting interface module 940, which may be configured to identify content related to keywords on the basis of attributes of profiles. In some embodiments, requests to target content to influencers on one or more keywords may be received by the user interface module (e.g., specified by a user, included in a request from a bid management system, etc.) and passed to the related targeting interface module 940. The targeting interface module 940 may then identify profiles belonging to influencers associated with the keywords and target content relevant to those keywords to be presented to the influencers, as described herein.

Example System

Figure 10:
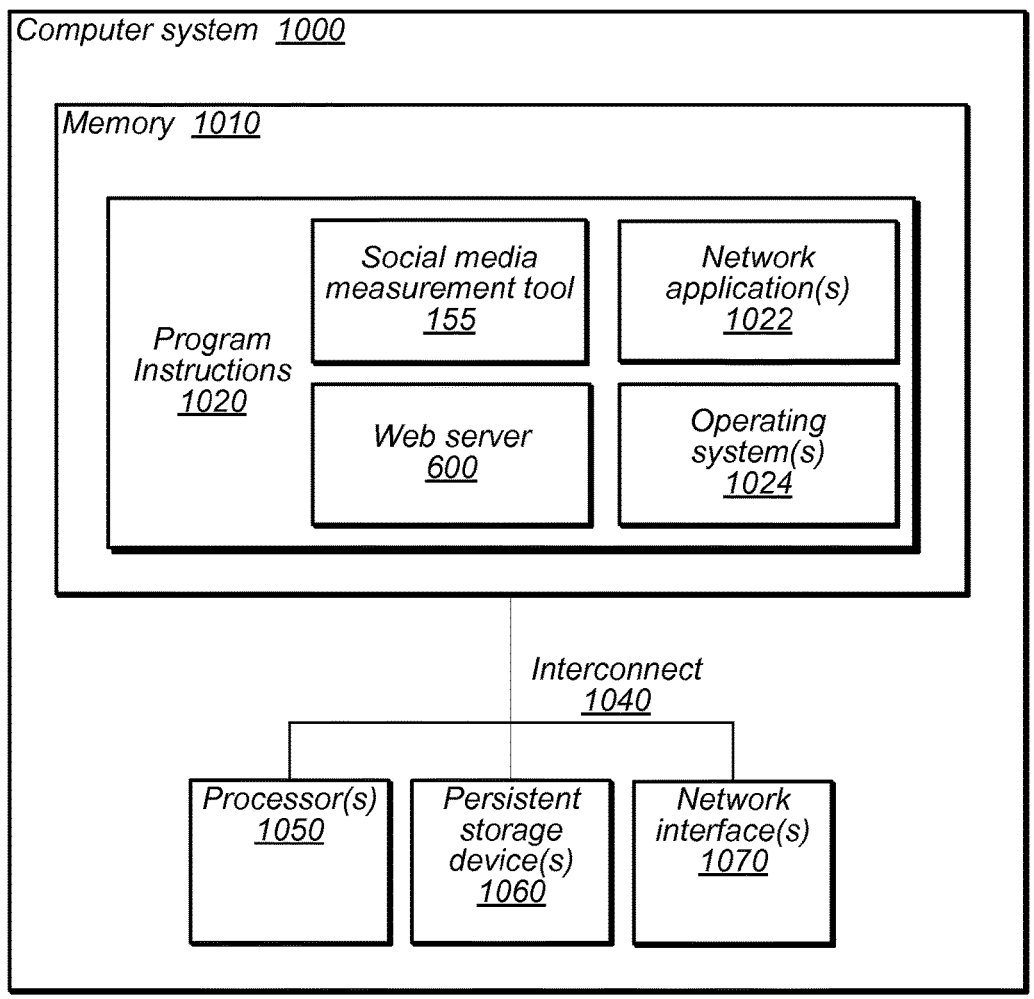
FIG. 10 is a block diagram illustrating a computer system configured to implement a social media measurement tool as described herein, according to various embodiments.

FIG. 10 is a block diagram illustrating a computer system configured to implement a social media measurement tool as described herein, according to various embodiments. FIG. 10 is a block diagram illustrating a computer system configured to implement a social media measurement tool as described herein, according to various embodiments. The computer system 1000 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The social media measurement tool, bid management system, search profile database, web server, and/or other components described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 1000 may include one or more processors 1050, each of which may include multiple cores, any of which may be single or multi-threaded. The computer system 1000 may also include one or more persistent storage devices 1060 (e.g. optical storage, magnetic storage, hard drive, tape drive, solid state memory, etc), which may persistently store data such as retrieved social media content. The system may also include one or more network interfaces 1070, which may be usable to communicate with users, clients, and/or social media platforms across a network (e.g., Internet).

According to the illustrated embodiment, computer system 1000 may include one or more memories 1010 (e.g., one or more of cache, SRAM, DRAM, RDRAM, EDO RAM, DDR 10 RAM, SDRAM, Rambus RAM, EEPROM, etc.). The one or more processors 1050, the storage device(s) 1060, network interfaces 1070, and the system memory 1010 may be coupled via interconnect 1040. Various embodiments may include fewer or additional components not illustrated in FIG. 10 (e.g., video cards, audio cards, additional network interfaces, peripheral devices, a network interface such as an ATM interface, an Ethernet interface, a Frame Relay interface, monitors, keyboards, speakers, etc.).

One or more of the system memories 1010 may contain program instructions 1020. Program instructions 1020 may be encoded in platform native binary, any interpreted language such as Java™ byte-code, or in any other language such as C/C++, Java™, etc or in any combination thereof. Program instructions 1020 may include program instructions to execute various components, such as social media measurement tool 155, servers 700, various network applications 1022 (e.g., recommendation engine 702, internal search system 704, behavioral targeting system 706, etc.), operating system 1024, and/or other software components. As described above, in various embodiments, the system need not include every one of these software components.

In some embodiments, memory 1010 may include any number of in-memory variables and data structures, such as those used to temporarily store retrieved social media content, to calculate social media metrics from the content, and/or to perform other calculations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method for determining that multiple social media profiles correspond to a common entity, the method comprising:

identifying, by a social media analysis tool executed by a processor, a first profile for a first social media platform, a second profile for a second social media platform, and a third profile for a third social media platform, wherein the first and the third profile have a first attribute, a second attribute, and a third attribute, wherein the second profile has the first attribute and lacks the second and third attributes, wherein the second attribute describes an entity name and the third attribute describes a geographical location;

determining, by the social media analysis tool based on the first profile and the second profile having different values for the first attribute, that a probability of both the first profile and the second profile corresponding to the common entity is less than a threshold;

determining, by the social media analysis tool, a uniqueness score for a combination of values of the second attribute and the third attribute in the first profile, wherein the uniqueness score indicates a likelihood of the second and third attributes having the combination of values, wherein determining the uniqueness score comprises determining a uniqueness of a name identified by the entity name from the second attribute being associated with the geographical location from the third attribute;

selecting, by the social media analysis tool based on the determined uniqueness score, the second and third attributes as a basis of comparison between the first profile and the third profile;

matching, by the social media analysis tool, the first profile to the third profile based on comparing the values in the first profile for the selected second and third attributes with values in the third profile for the selected second and third attributes;

matching, by the social media analysis tool, the second profile and the third profile based at least in part on the second and third profiles having corresponding values for the first attribute; and updating, by the social media analysis tool, the probability of both the first profile and the second profile corresponding to the common entity so that the probability exceeds the threshold, wherein the probability is updated based on matching the first profile to the third profile using the second and third attributes and matching the second profile to the third profile using the first attribute.

2. The method of claim 1, further comprising determining that the uniqueness score exceeds a threshold uniqueness score, wherein selecting the second and third attributes as the basis of comparison between the first profile and the third profile is performed based at least in part on the uniqueness score exceeding the threshold uniqueness score.

3. The method of claim 1, wherein matching the first profile to the third profile comprises comparing a web page attribute for the first profile with a web page attribute for the third profile.

4. The method of claim 3, wherein each of the web page attribute for the first profile and the web page attribute for the third profile describes, for each profile of the first profile and the third profile, at least one of:

a respective web page linked by the profile and external to each of the first social media platform and the third social media platform; and a respective web page linked by a social media thread modified by or accessed by the profile and external to each of the first social media platform and the third social media platform.

5. The method of claim 3, wherein each of the web page attribute for the first profile and the web page attribute for the third profile describes a respective word frequency distribution for a respective web page accessible via the profile that is external to each of the first social media platform and the third social media platform.

6. The method of claim 1, wherein matching the first profile to the third profile further comprises comparing a social media content attribute for the first profile with a social media content attribute for the third profile.

7. The method of claim 6, wherein each of the social media content attribute for the first profile and the social media content attribute for the third profile describes, for each profile of the first profile and the third profile, at least one of:
- a respective social media post authored by the profile and accessible via the first social media platform or the second social media platform;
- a respective social media post rated by the profile and accessible via the first social media platform or the second social media platform; and
- a respective social media post flagged by the profile and accessible via the first social media platform or the second social media platform.

8. The method of claim 6, wherein each of the social media content attribute for the first profile and the social media content attribute for the third profile describes, for each profile of the first profile and the third profile, a respective word frequency distribution for a respective social media post accessible via the first social media platform or the third social media platform.

9. The method of claim 6, wherein each of the social media content attribute for the first profile and the social media content attribute for the third profile describes, for each profile of the first profile and the third profile, a respective writing style for a respective social media post accessible via the first social media platform or the third social media platform.

10. The method of claim 1, further comprising:
prior to receiving the first profile:
- receiving, from a client associated with the first profile, a search request for content from a content provider, determining that the content provider lacks information regarding interactions with the client, and
- responsive to determining that the content provider lacks the information regarding interactions with the client, requesting the first profile;
generating, subsequent to matching the first profile to the third profile and updating the probability, a recommendation for additional content based on determining that the first profile, the second profile, and third profile all correspond to the common entity; and
providing the recommendation to the client.

11. The method of claim 1, wherein the first attribute is a profile picture associated with a social media profile.

12. The method of claim 1, wherein the matching of the first profile to the third profile is used to tailor product recommendations to the user.

13. A non-transitory computer-readable medium embodying program code executable by a processor to provide a social media analysis tool for determining that multiple social media profiles correspond to a common entity, the program code comprising:
program code for identifying a first profile for a first social media platform, a second profile for a second social media platform, and a third profile for a third social media platform, wherein the first and the third profile have a first attribute, a second attribute, and a third attribute, wherein the second profile has the first attribute and lacks the second and third attributes, wherein the second attribute describes an entity name and the third attribute describes a geographical location;
program code for determining, based on the first profile and the second profile having different values for the first attribute, that a probability of both the first profile and the second profile corresponding to the common entity is less than a threshold;
program code for determining a uniqueness score for a combination of values of the second attribute and the third attribute in the first profile, wherein the uniqueness score indicates a likelihood of the second and third attributes having the combination of values, wherein determining the uniqueness score comprises determining a uniqueness of a name identified by the entity name from the second attribute being associated with the geographical location from the third attribute;
program code for selecting, based on the determined uniqueness score, the second and third attributes as a basis of comparison between the first profile and the third profile;
program code for matching the first profile to the third profile based on comparing the values in the first profile for the selected second and third attributes with values in the third profile for the selected second and third attributes;
program code for matching the second profile and the third profile based at least in part on the second and third profiles having corresponding values for the first attribute; and
program code for updating the probability of both the first profile and the second profile corresponding to the common entity so that the probability exceeds the threshold, wherein the probability is updated based on matching the first profile to the third profile using the second and third attributes and matching the second profile to the third profile using the first attribute.

14. The non-transitory computer-readable medium of claim 13, wherein the program code further comprises program code for determining that the uniqueness score exceeds a threshold uniqueness score, wherein selecting the second and third attributes as the basis of comparison between the first profile and the third profile is performed based at least in part on the uniqueness score exceeding the threshold uniqueness score.

15. The non-transitory computer-readable medium of claim 13, wherein the program code for matching the first profile to the third profile comprises program code for comparing a web page attribute for the first profile with a web page attribute for the third profile.

16. The non-transitory computer-readable medium of claim 15, wherein each of the web page attribute for the first profile and the web page attribute for the third profile describes, for each profile of the first profile and the third profile, at least one of:
- a respective web page linked by the profile and external to each of the first social media platform and the third social media platform; and
- a respective web page linked by a social media thread modified by or accessed by the profile and external to each of the first social media platform and the third social media platform.

17. The non-transitory computer-readable medium of claim 13, wherein the program code for wherein matching the first profile to the third profile comprises program code for comparing a social media content attribute for the first profile with a social media content attribute for the third profile,
   wherein each of the social media content attribute for the first profile and the social media content attribute for the third profile describes, for each profile of the first profile and the third profile, at least one of:
      a respective social media post authored by the profile and accessible via the first social media platform or the second social media platform;
      a respective social media post rated by the profile and accessible via the first social media platform or the second social media platform; and
      a respective social media post flagged by the profile and accessible via the first social media platform or the second social media platform.

18. A system comprising:
   a processor, and
   a non-transitory computer-readable medium communicatively coupled to the processor and embodying a social media analysis tool for determining that multiple social media profiles correspond to a common entity;
   wherein the processor is configured to execute the social media analysis tool, wherein executing the social media analysis tool causes the processor to perform operations comprising:
      identifying a first profile for a first social media platform, a second profile for a second social media platform, and a third profile for a third social media platform, wherein the first and the third profile have a first attribute, a second attribute, and a third attribute, wherein the second profile has the first attribute and lacks the second and third attributes, wherein the second attribute describes an entity name and the third attribute describes a geographical location,
      determining, based on the first profile and the second profile having different values for the first attribute, that a probability of both the first profile and the second profile corresponding to the common entity is less than a threshold,
      determining a uniqueness score for a combination of values of the second attribute and the third attribute in the first profile, wherein the uniqueness score indicates a likelihood of the second and third attributes having the combination of values, wherein determining the uniqueness score comprises determining a uniqueness of a name identified by the entity name from the second attribute being associated with the geographical location from the third attribute,
      selecting, based on the determined uniqueness score, the second and third attributes as a basis of comparison between the first profile and the third profile,
      matching the first profile to the third profile based on comparing the values in the first profile for the selected second and third attributes with values in the third profile for the selected second and third attributes,
      matching the second profile and the third profile based at least in part on the second and third profiles having corresponding values for the first attribute, and
      updating the probability of both the first profile and the second profile corresponding to the common entity so that the probability exceeds the threshold, wherein the probability is updated based on matching the first profile to the third profile using the second and third attributes and matching the second profile to the third profile using the first attribute.

* * * * *